US011392205B2

(12) United States Patent
Takahashi et al.

(10) Patent No.: US 11,392,205 B2
(45) Date of Patent: Jul. 19, 2022

(54) VIBRATION ACTUATOR AND VIBRATION PRESENTING APPARATUS

(71) Applicants: Yuki Takahashi, Tokyo (JP); Tomoya Ishitani, Tokyo (JP); Takayuki Numakunai, Tokyo (JP)

(72) Inventors: Yuki Takahashi, Tokyo (JP); Tomoya Ishitani, Tokyo (JP); Takayuki Numakunai, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 0 days.

(21) Appl. No.: 17/098,386

(22) Filed: Nov. 15, 2020

(65) Prior Publication Data
US 2021/0149491 A1    May 20, 2021

(30) Foreign Application Priority Data
Nov. 15, 2019    (JP) .............................. JP2019-207380

(51) Int. Cl.
*G06F 3/01* (2006.01)
*G06F 3/044* (2006.01)
*H02K 33/18* (2006.01)

(52) U.S. Cl.
CPC .............. *G06F 3/016* (2013.01); *G06F 3/044* (2013.01); *H02K 33/18* (2013.01)

(58) Field of Classification Search
None
See application file for complete search history.

(56) References Cited

U.S. PATENT DOCUMENTS

| 2015/0169061 A1 | 6/2015 | Odajiama et al. |
| 2018/0239432 A1* | 8/2018 | Hwang ................... G06F 3/016 |
| 2018/0246571 A1* | 8/2018 | Jeitner .................. G06F 3/0338 |

FOREIGN PATENT DOCUMENTS

| JP | 2015-070729 | 4/2015 |
| JP | 2016-163854 | 9/2016 |

OTHER PUBLICATIONS

European Search Report and the European Search Opinion dated Apr. 29, 2021 From the European Patent Office Re. Application No. 20207216.1. (7 Pages).

* cited by examiner

*Primary Examiner* — Stephen T. Reed

(57) ABSTRACT

Provided is a vibration actuator that gives vibration to a vibration presenting unit that presents vibration depending on a pressing operation, the vibration actuator comprising: a fixing part; a movable part fixed to the vibration presenting unit; an elastic support part connected to the fixing part and the movable part, and movably supports the movable part with respect to the fixing part; and a support-part side fixing part fixed to the elastic support part in the movable part; wherein a strain body that is strained in accordance with the pressing operation on the vibration presenting unit and a strain detection unit configured to detect strain of the strain body are provided between the support-part side fixing part and a presenting-unit side fixing part fixed to the vibration presenting unit, and the movable part is configured to vibrate by electromagnetic driving in accordance with the strain of the strain body.

11 Claims, 24 Drawing Sheets

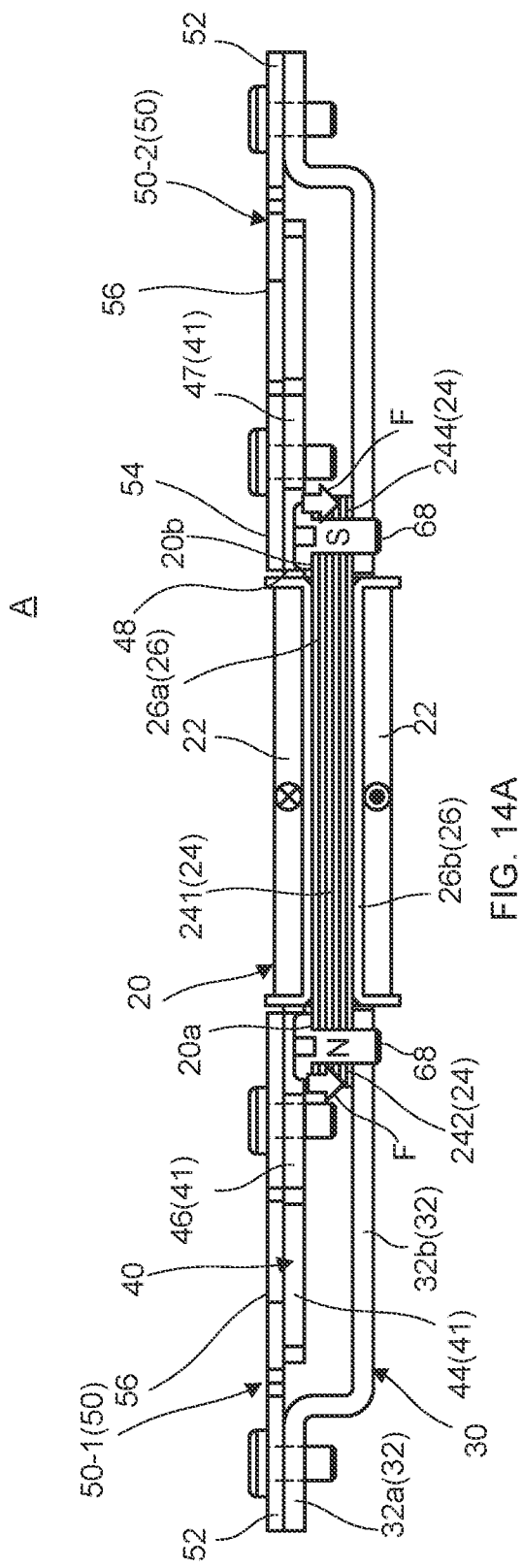
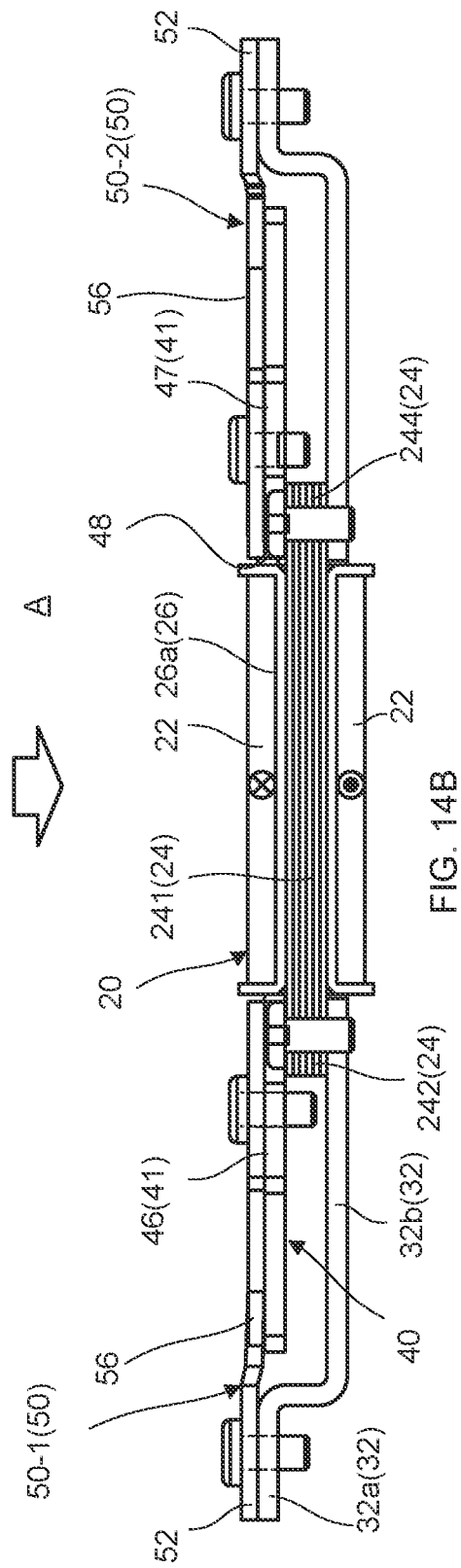

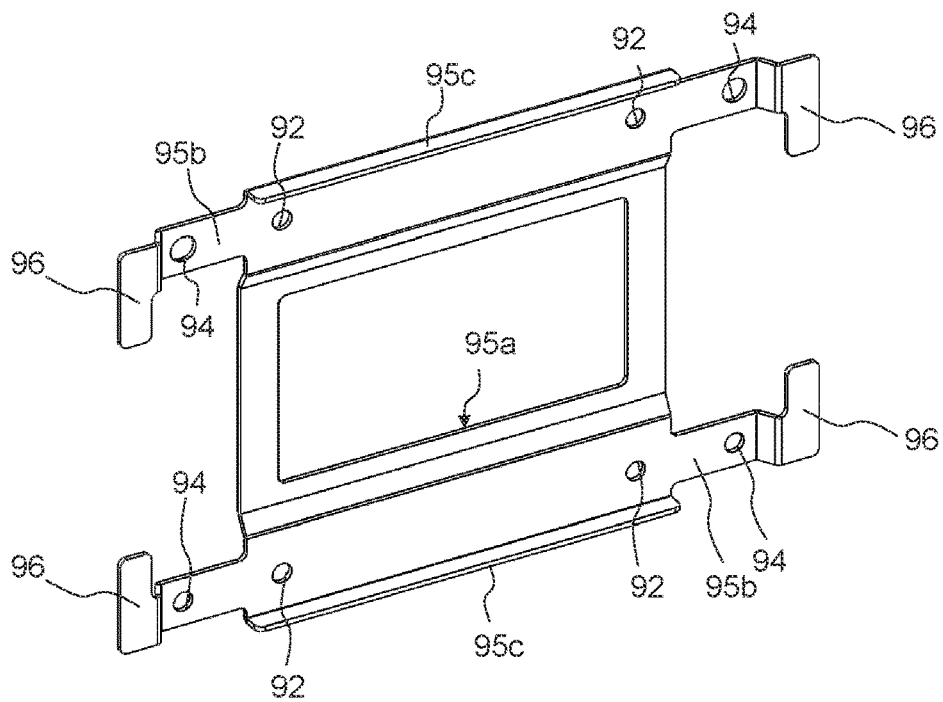
FIG. 24
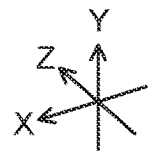
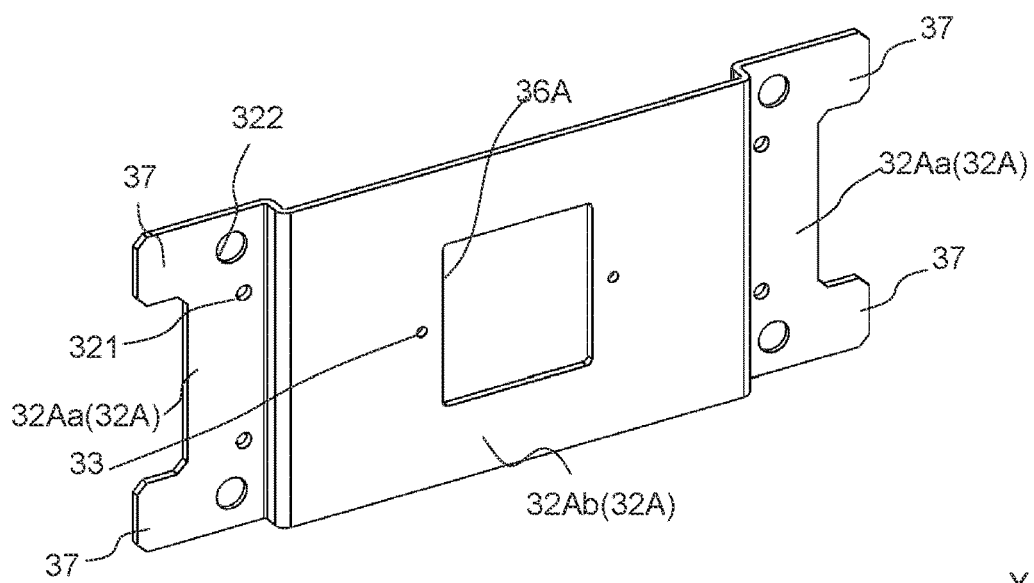
FIG. 25
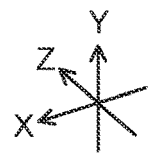

VIBRATION ACTUATOR AND VIBRATION PRESENTING APPARATUS

CROSS REFERENCE TO RELATED APPLICATIONS

This application is entitled to or claims the benefit of Japanese Patent Application No. 2019-207380, filed on Nov. 15, 2019, the disclosure of which including the specification, drawings and abstract is incorporated herein by reference in its entirety.

TECHNICAL FIELD

The present invention relates to a vibration actuator that gives vibration depending on a pressing operation, and a vibration presenting apparatus including the vibration actuator.

BACKGROUND ART

Conventionally, at the time of operating a touch panel that is a sensing panel, there is known a configuration in which vibration is given by a vibration actuator as a touch operation feeling (a feeling of being operated by touching) to a finger pulp or the like of an operator who touches a display screen displayed on the touch panel (see PTL 1 and PTL 2).

PTL 1 discloses a portable terminal device in which a vibration actuator is mounted on a back surface of a touch panel via a vibration transmitting part. In this vibration actuator, a movable part is disposed inside a housing fixed to the vibration transmitting part to be reciprocally movable along a guide shaft disposed vertically with respect to the touch panel. This vibration actuator gives vibration to the finger pulp that is touching the touch panel via the vibration transmitting part by causing movable part to collide with the housing in response to operations to the touch panel.

Further, PTL 2 discloses a vibration presenting apparatus that gives vibration in response to operations to a touch panel. In this vibration presenting apparatus, a voice coil motor for generating vibration, a support part that is disposed with a vibration panel and compressed by a prescribed force, a damper that gives breaking work on the vibration of a vibration part, and a spring that gives a compression force to the support part and the damper are provided in parallel between the vibration panel that is the vibration part presenting vibration and a housing that supports the vibration panel.

CITATION LIST

Patent Literature

PTL 1: Japanese Patent Application Laid-Open No. 2015-070729
PTL 2: Japanese Patent Application Laid-Open No. 2016-163854

SUMMARY OF INVENTION

Technical Problem

However, in such a vibration presenting apparatus, it is desired to express a vibration that provide a touch operation feeling corresponding to an application and a use situation of an operation device.

For example, in a case where a vibration is given in accordance with a pressing amount at the time of a pressing operation on a touch panel, it is conceivable that there is a configuration in which a strain body is provided in a portion that changes in accordance with an actual operation on the touch panel, a strain in the strain body is detected, and the vibration is given in accordance with detected amount of the strain. In this case, it is desirable that the strain body is disposed in a portion having a large amount of displacement. However, in the portion having a large amount of displacement, the strain body is also displaced in accordance with the displacement of the portion, and it is difficult to ensure a fatigue durability of the strain body. In addition, it is necessary to secure a mounting space for the strain body so as not to inhibit the displacement of a portion having a large displacement, and there is a problem that the thickness of the portion to which the strain body is mounted is increased.

The present invention has been made in view of these points, and an object of the present invention is to provide a vibration actuator and a vibration presenting apparatus that can stably and reliably express vibration corresponding to various touch operation feelings by a pressing operation, and achieve high reliability and compactness.

Solution to Problem

A vibration actuator of the present invention is a vibration actuator that gives vibration to a vibration presenting unit that presents vibration depending on a pressing operation, the vibration actuator comprising:
 a fixing part;
 a movable part; and
 an elastic support part that movably supports the movable part with respect to the fixing part;
 wherein the movable part includes a support-part side fixing part fixed to the elastic support part and a presenting-unit side fixing part fixed to the vibration presenting unit,
 a strain body that is strained in accordance with the pressing operation on the vibration presenting unit and a strain detection unit configured to detect strain of the strain body are provided between the support-part side fixing part and the presenting-unit side fixing part, and
 the movable part is configured to vibrate by electromagnetic driving in accordance with the strain of the strain body.

A vibration presenting apparatus of the present invention, comprising:
 a touch panel as the vibration presenting unit; and
 a vibration actuator having above configuration, that gives vibration to the touch panel.

Advantageous Effects of Invention

The present invention is capable of stably and reliably expressing vibration corresponding to various touch operation feelings by a pressing operation, and achieving high reliability and compactness.

BRIEF DESCRIPTION OF DRAWINGS

FIG. 14A is a view for explaining the operation of the same actuator main body;

FIG. 14B is a view for explaining the operation of the same actuator main body;

FIG. 24 is a rear perspective view of the strain body;

FIG. 25 is a rear perspective view of the base;

DESCRIPTION OF EMBODIMENTS

Hereinafter, embodiments of the present invention will be described in detail with reference to the drawings.

An orthogonal coordinate system (X, Y, Z) is used for explanation in the present embodiments. The same orthogonal coordinate system (X, Y, Z) is also used for showing in drawings described later. Hereinafter, the width, height, and length of vibration presenting apparatus 200 having vibration actuator 10 are lengths in X direction, Y direction, and Z direction, respectively. The width, height, and length of vibration actuator 10 are also lengths in X direction, Y direction, and Z direction, respectively. In addition, a plus side in Z direction is a direction to give vibration feedback to an operator, which is described as "front side". A minus side in Z direction is a direction to be pressed when the operator operates, which is described as "rear side".

(Basic Configuration of Vibration Presenting Apparatus 200 Having Vibration Actuator 10)

Figure 1:
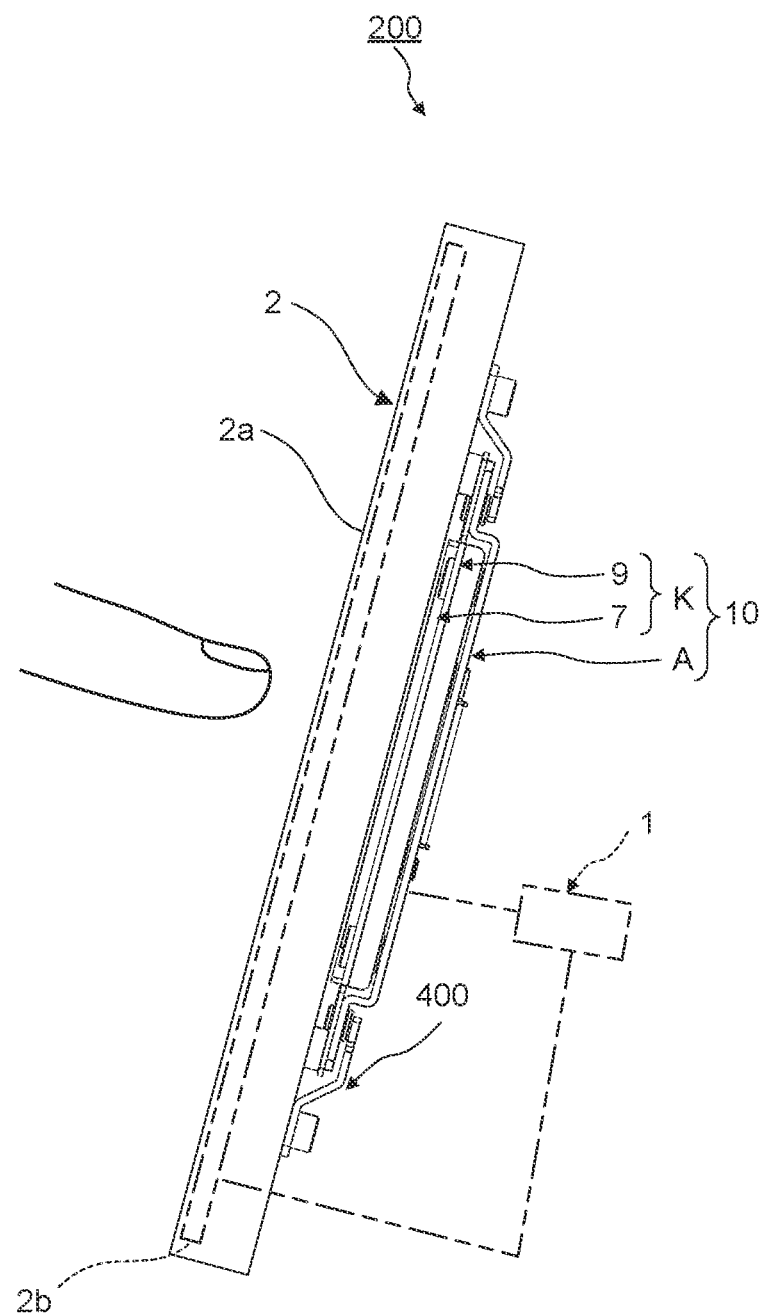
FIG. 1 is a plan view of a vibration presenting apparatus having a vibration actuator according to Embodiment 1 of the present invention.
Figure 2:
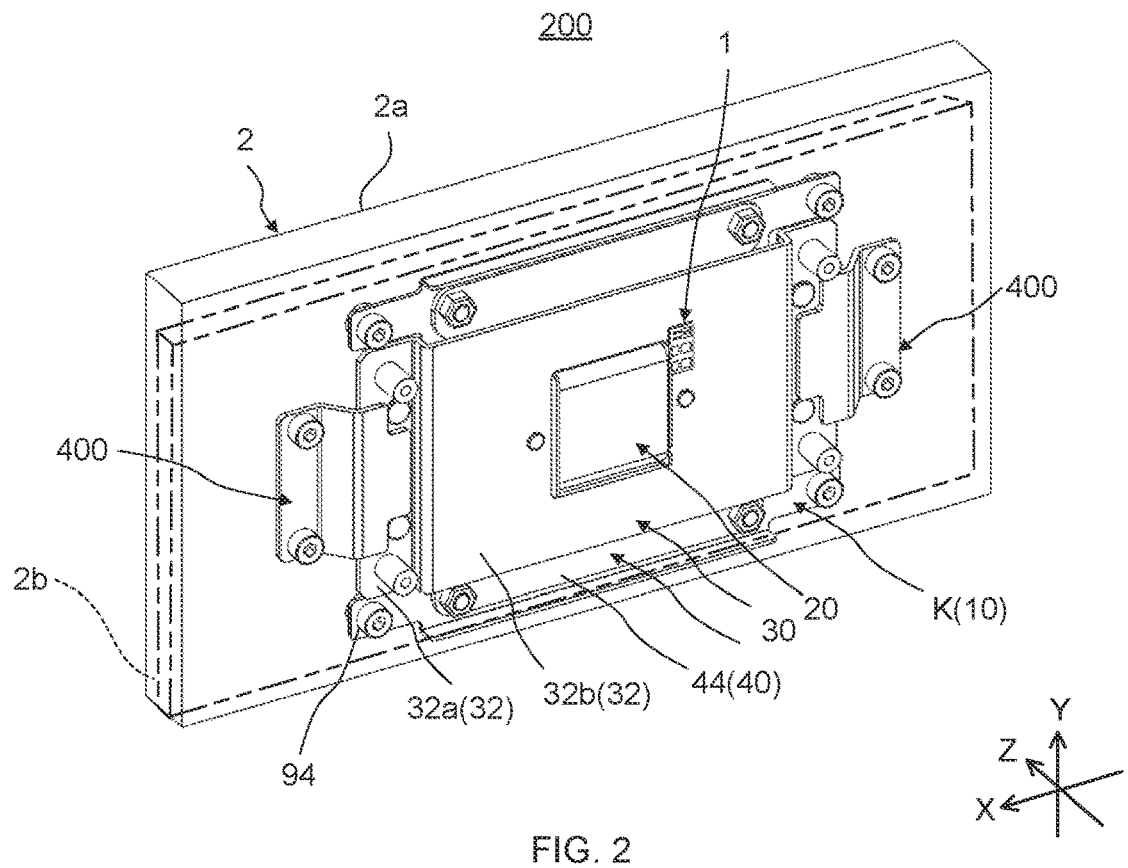
FIG. 2 is a rear perspective view of the same vibration presenting apparatus.

Vibration presenting apparatus 200 shown in FIGS. 1 and 2 includes vibration actuator 10 and an operation device (touch panel 2 in the present embodiment) as a vibration presenting unit that is performed a touch operation by an operator. In vibration presenting apparatus 200, vibration is given to the operation device in response to the touch operation to the operation device of the operator. That is, a touch operation feeling (also referred to as "haptic feeling", "force sense") is given to the operator who touches and operates the operation device via the operation device.

In the present embodiment, the operation device is touch panel 2 which displays a screen and is operated by touching the screen. Touch panel 2 is a touch panel such as an electrostatic type, a resistive film type, or an optical type. Note that, touch panel 2 detects a touch position of the operator and is controlled by the control unit 1 (see FIG. 2). In the present embodiment, touch panel 2 is an electrostatic type touch panel. Control unit 1 can obtain information of the touch position of the user through a touch panel control unit which is not illustrated. Further, screen 2a of touch panel 2 may comprise a display unit such as a liquid crystal system, an organic EL system, an electronic paper system, a plasma system, or the like. Touch panel 2 may be controlled by the touch panel control unit. The touch panel control unit controls a display information which is not illustrated and presents image corresponding to the type of presentation vibration on the screen to the operator.

Vibration presenting apparatus 200 is used, for example, as an electronic device, as a touch panel device of a car navigation system. Vibration presenting apparatus 200 functions as a device that presents vibration to the operator who operates by touching screen 2a of touch panel 2. At this time, any electronic device that gives the haptic feeling to the operator by presenting vibration to the operator who touches a vibration object may be used as vibration presenting apparatus 200. For example, vibration presenting apparatus 200 may be an image device such as a smart phone, a tablet-type computer, a TV, or the like, a game machine with a touch panel, a game controller with a touch panel, or the like.

Specifically, in vibration presenting apparatus 200, when screen 2a of touch panel 2 is operated by touching a pressing object such as the finger pulp or the like of the operator to screen 2a of touch panel 2, vibration actuator 10 is driven to vibrate in response to the operation. This vibration gives the haptic feeling to the operator.

Vibration actuator 10 of the present embodiment gives various types of the haptic feelings corresponding to a display image operated by the operator. For example, vibration actuator 10 gives the haptic feelings as mechanical switches such as a haptic switch, alternate type switch, momentary switch, toggle switch, sliding switch, rolling switch, DIP switch and a rocker switch in accordance with an image to be touched and operated. Further, vibration actuator 10 may also give the haptic feeling of the switch with different degrees of push-in in a push type switch.

Note that, in vibration presenting apparatus 200, an operation device, which does not have a display function and can be simply touched and operated by the operator, may be used instead of touch panel 2 as the operation device.

Figure 3:
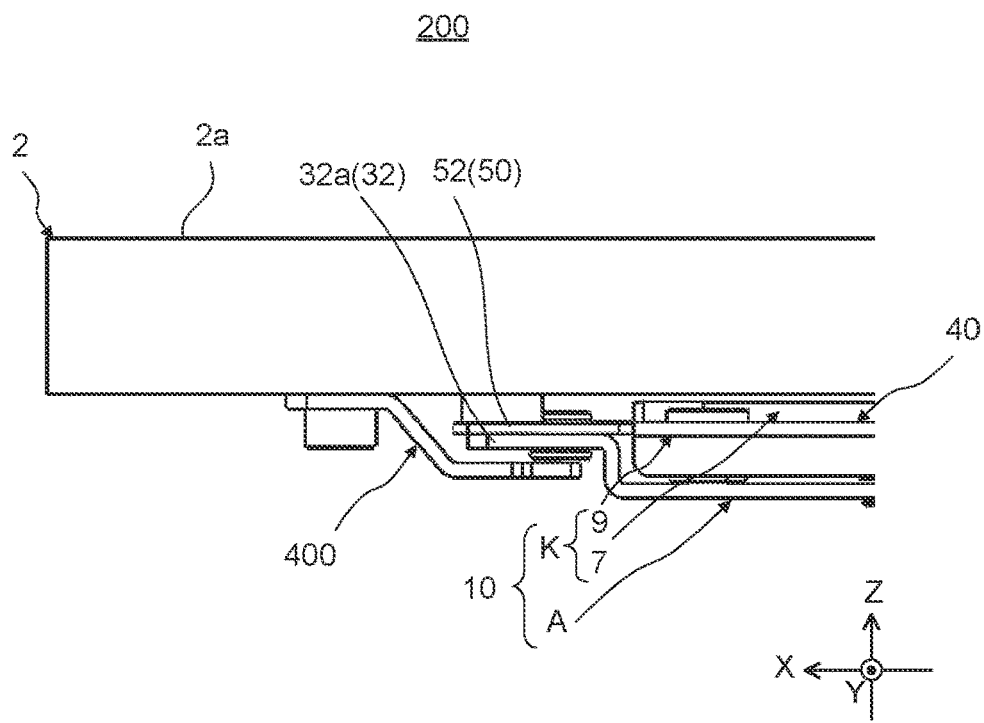
FIG. 3 is an enlarged plan view showing a stopper of the vibration presenting apparatus in FIG. 1.
Figure 4:
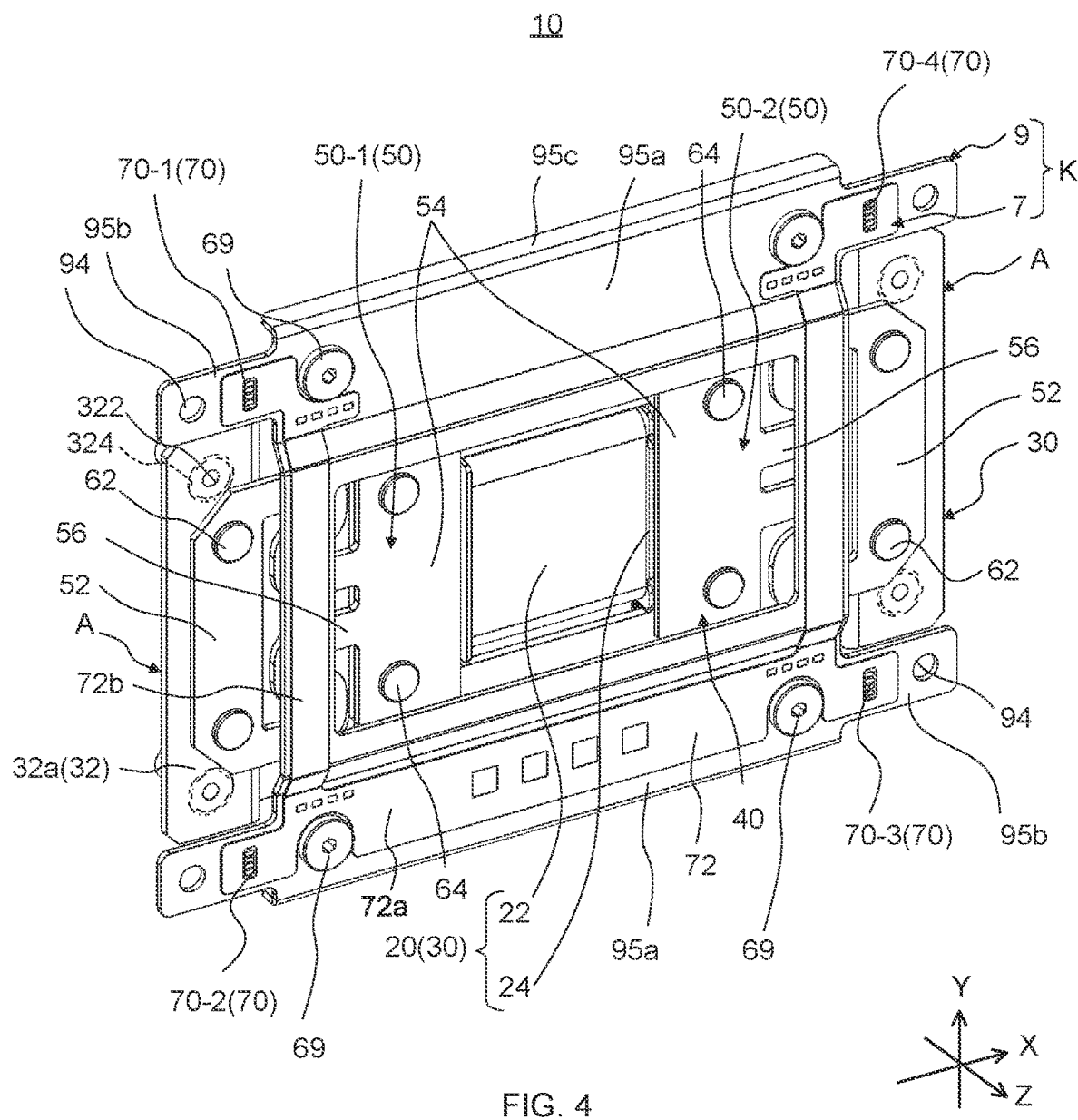
FIG. 4 is a front perspective view of the vibration actuator.
Figure 5:
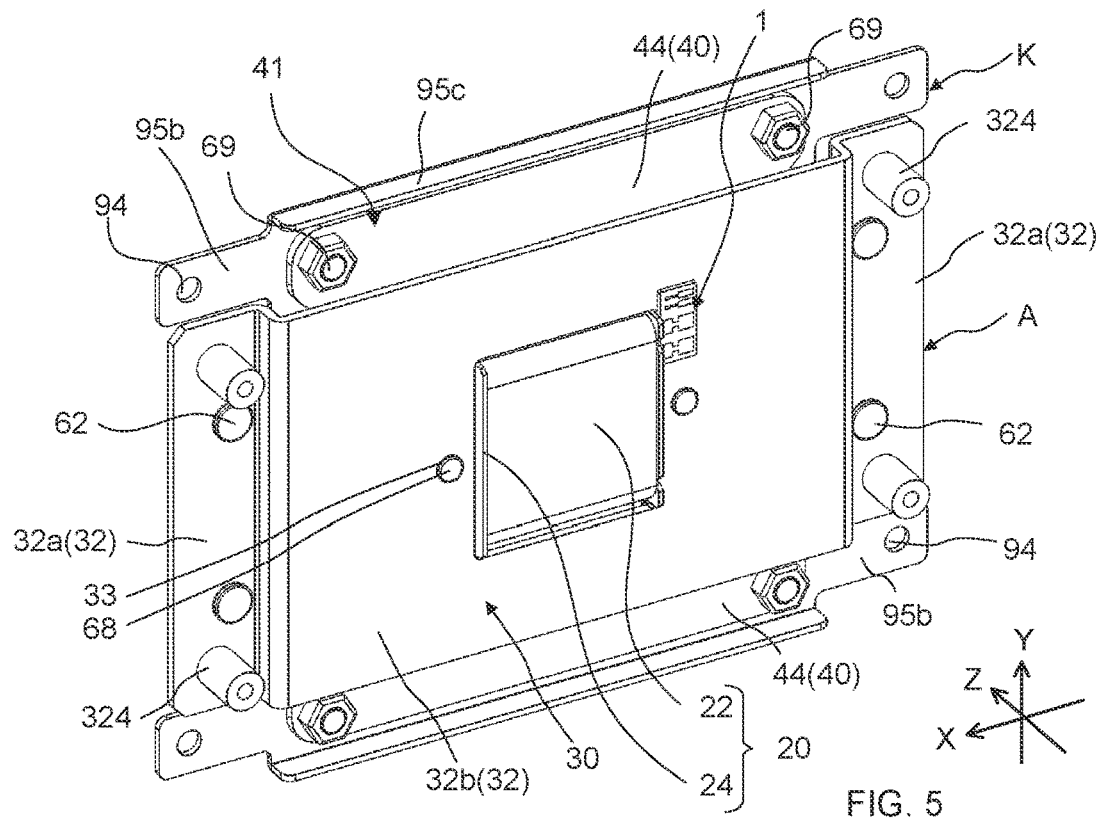
FIG. 5 is a rear perspective view of the same vibration actuator.
Figure 6:
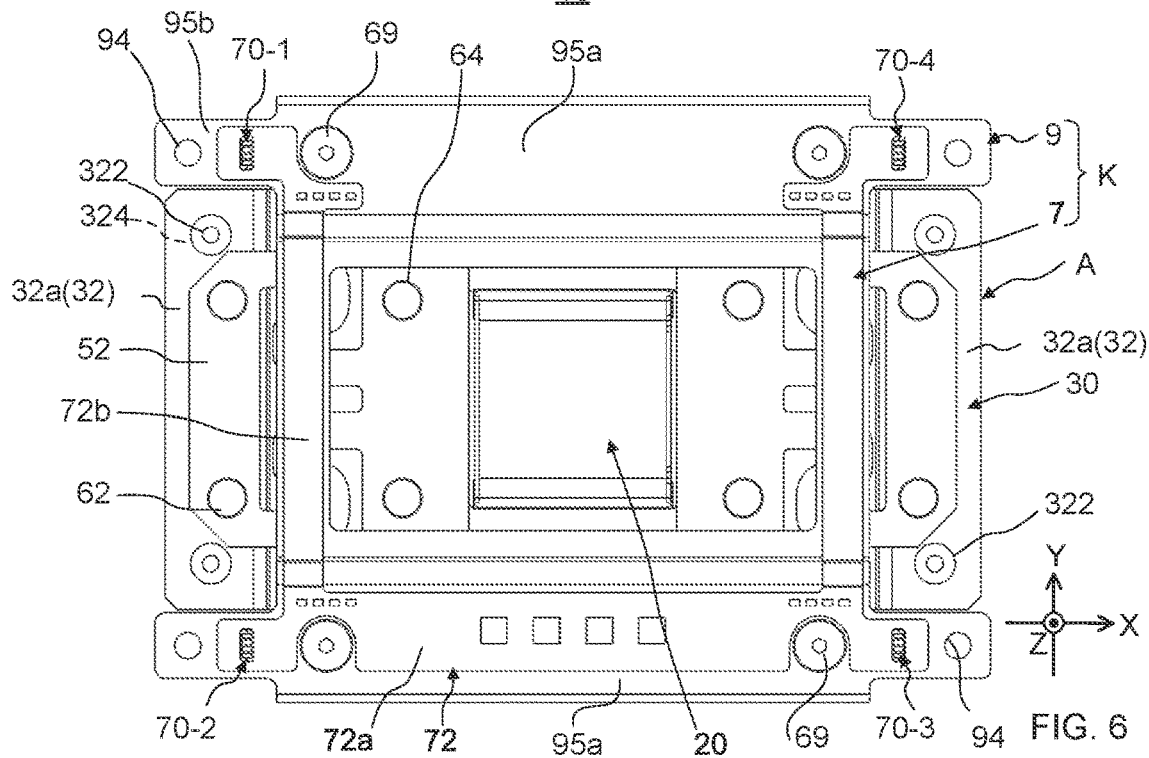
FIG. 6 is a front view of the same vibration actuator.
Figure 7:
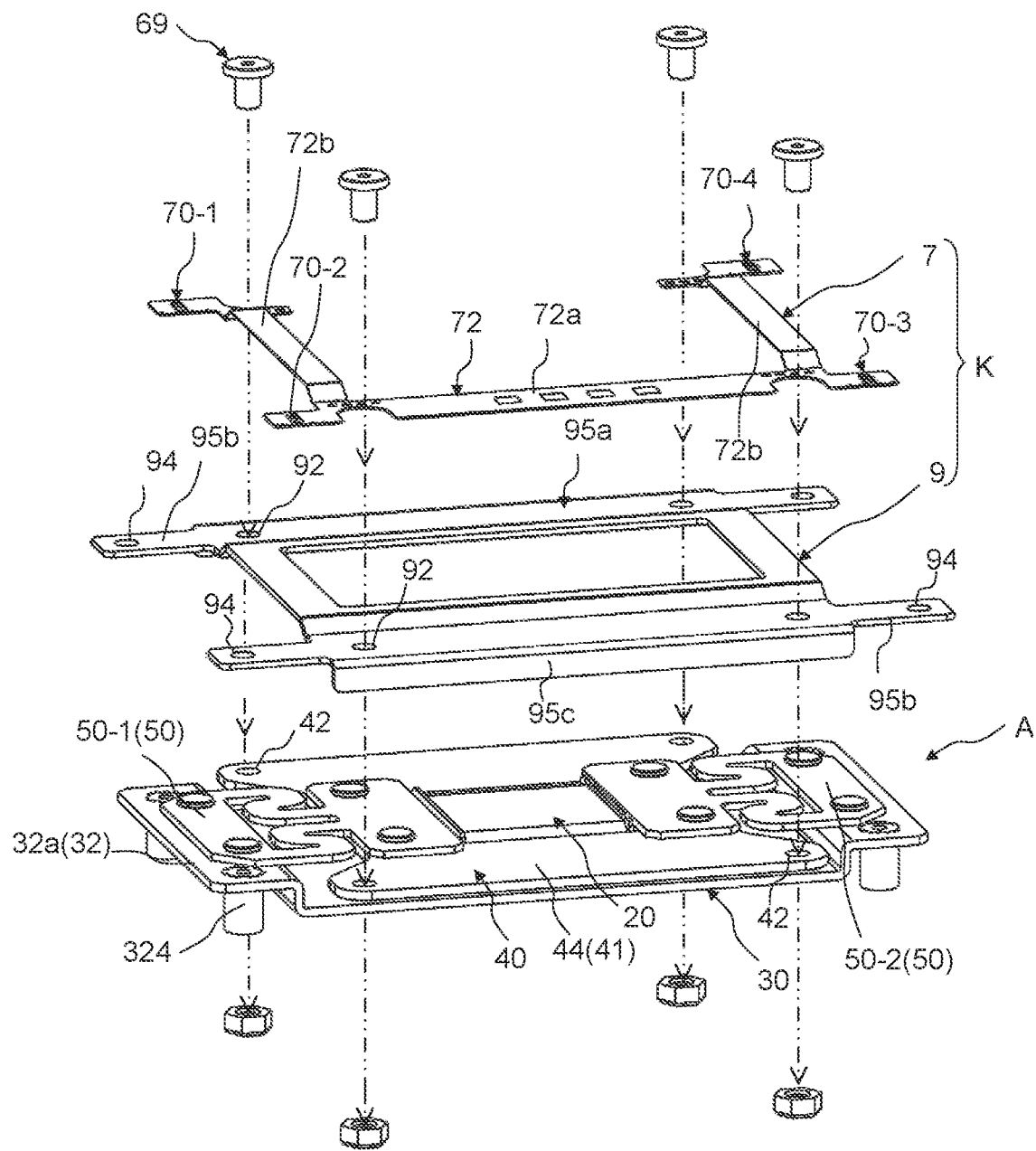
FIG. 7 is a front exploded perspective view of the vibration actuator.
Figure 8:
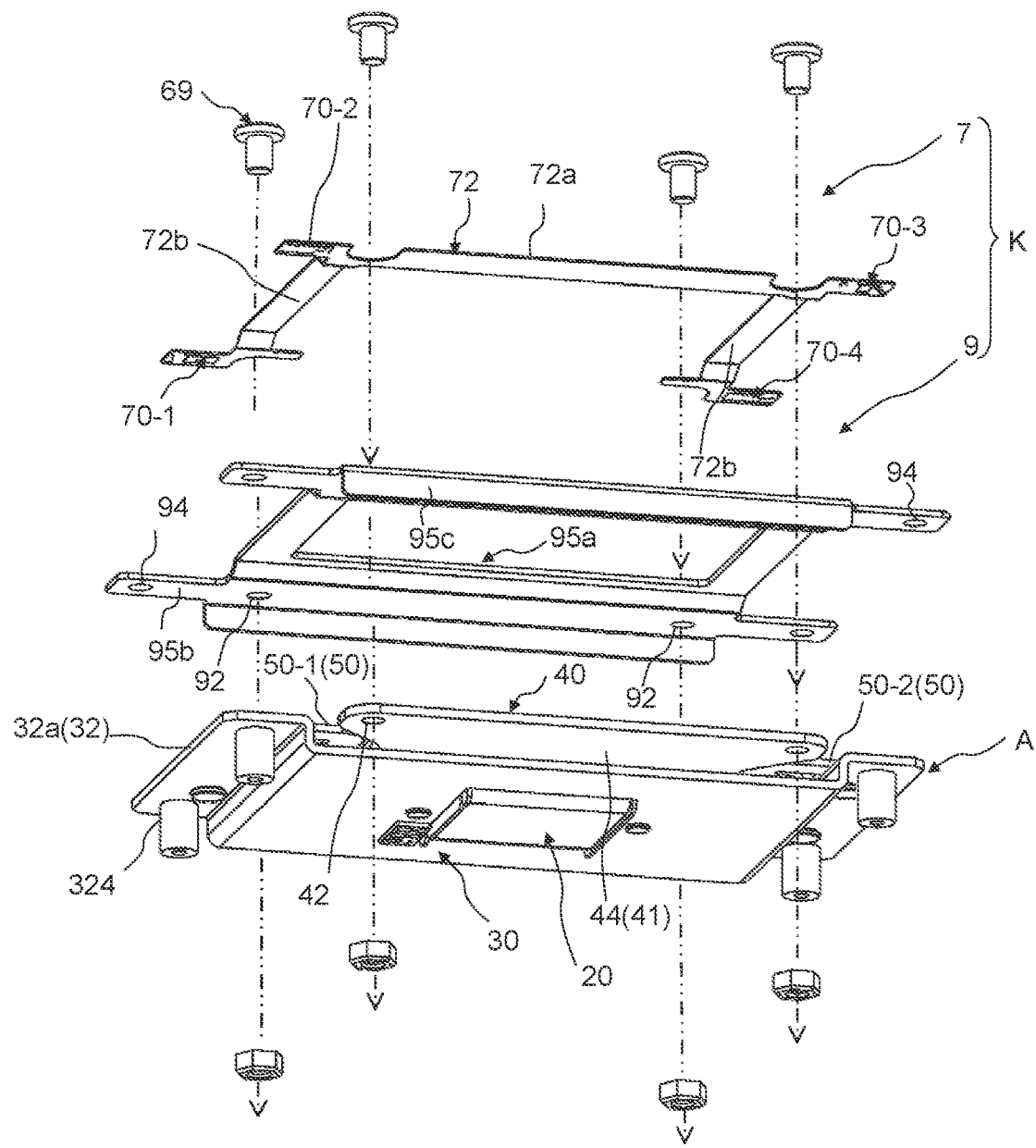
FIG. 8 is a rear exploded perspective view of the same vibration actuator.

In vibration presenting apparatus 200 shown in FIGS. 1 to 3, vibration actuator 10 is disposed between touch panel 2 and base (not shown) disposed at the back surface side of touch panel 2. Vibration actuator 10 is fixed to a base (not shown) by fixing part 30.

Touch panel 2, at the back side thereof, is fixed to strain generating member 9 of load detection module K provided in movable part 40 (see FIG. 2) of actuator main body A in the vibration actuator 10. Thus, vibration actuator 10 is disposed so as to connect each other between each of touch panel 2 and base (not shown).

Touch panel 2 itself can be driven integrally with movable part 40. A direction in which the finger or the like of the operator touches and presses screen 2a of touch panel 2, for example, a direction perpendicular to the screen of touch panel 2 (also referred to as a "surface perpendicular direction") is included in the same direction as the Z direction which is the vibration direction of movable part 40 in vibration actuator 10. In vibration actuator 10, stoppers 400 regulate the movement of movable part 40 to the positive side in the Z direction with respect to touch panel 2.

Thus, according to vibration presenting apparatus 200 in which control unit 1, touch panel 2 and vibration actuator 10 are mounted, touch panel 2 can be directly vibrated because touch panel 2 can be directly operated, that is, touch panel 2 is driven together with movable part 40 in the same direction as a touching direction of the finger.

Therefore, when an image displayed on touch panel 2 is operated by touching, movable part 40 can be moved to give a vibration to be an operation feeling which corresponds to the image with respect to touch panel 2. Note that the image may be an image of an object or the like that gives a haptic feeling to a finger or the like when touched, an image of an object that moves while giving a haptic feeling by a touch operation, or the like.

As a result, touch panel 2 can present vibration to the operator and express a comfortable operation.

Touch panel 2 of the present embodiment includes position detection unit 2b that detects, in a non-contact manner, a position of a finger (pressing object) of the operator who performs a pressing operation on screen 2a of touch panel 2. Position detection unit 2b is a proximity sensor that electrically detects the presence of a pressing object in proximity. In the present embodiment, position detection unit 2b detects the position of the finger by detecting the capacitance with the finger of the operator.

A capacitive sensor used in an ordinary capacitive touch panel has a level of sensitivity that responds at a position of a finger in contact with a screen. On the other hand, position detection unit 2b of the present embodiment can detect the finger even in a state in which the finger is not in contact with screen 2a and is separated from screen 2a by a predetermined distance. This predetermined interval is set by setting the sensitivity of position detection unit 2b for detecting the capacitance to be higher than the sensitivity of a capacitance sensor used for detecting a pressing object coming into contact with a screen in an ordinary touch panel. Thus, position detection part 2b has detection sensitivity capable of detecting the position of the pressing object such as a finger or the like even in contact through a material whose capacitance cannot be detected. Movable part 40 of vibration actuator 10 is driven by the control unit 1, which will be described later, based on the position of the finger detected by position detection unit 2b.

<Entire Configuration of Vibration Actuator 10>

FIGS. 4 to 8 are a front perspective view, a rear perspective view, a front view, a front exploded perspective view, and a rear exploded perspective view of vibration actuator 10, respectively.

Vibration actuator 10 is a plate-shaped vibration actuator, and is disposed so as to face the back surface side of touch panel 2 in a thickness direction when the Z direction is the thickness direction.

Vibration actuator 10 includes control unit 1, actuator main body A, and load detection module K. Control unit 1 may be provided in actuator main body A in the present embodiment. Load detection module K includes strain generating member 9 and strain detector 7 provided on strain generating member 9.

Vibration actuator 10 detects the strain of strain generating member 9 by strain detector 7 when touch panel 2 is operated and pressed, and vibration actuator 10 vibrates in accordance with the detection result of strain detector 7 to give vibration to touch panel 2. First, actuator main body A will be described.

<Actuator Main Body a>

Figure 9:
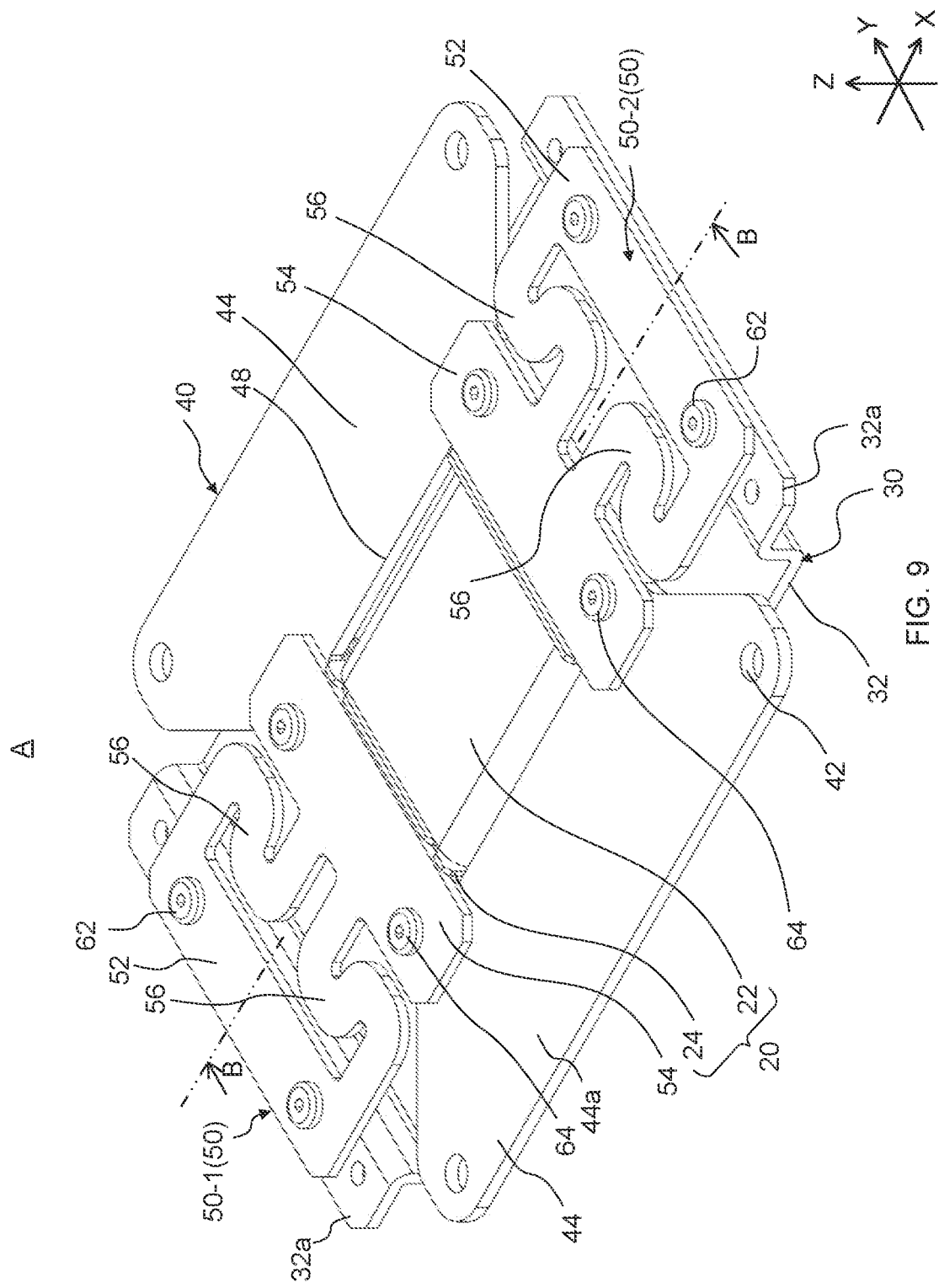
FIG. 9 is a front perspective view of an actuator main body of the same vibration actuator.
Figure 10:
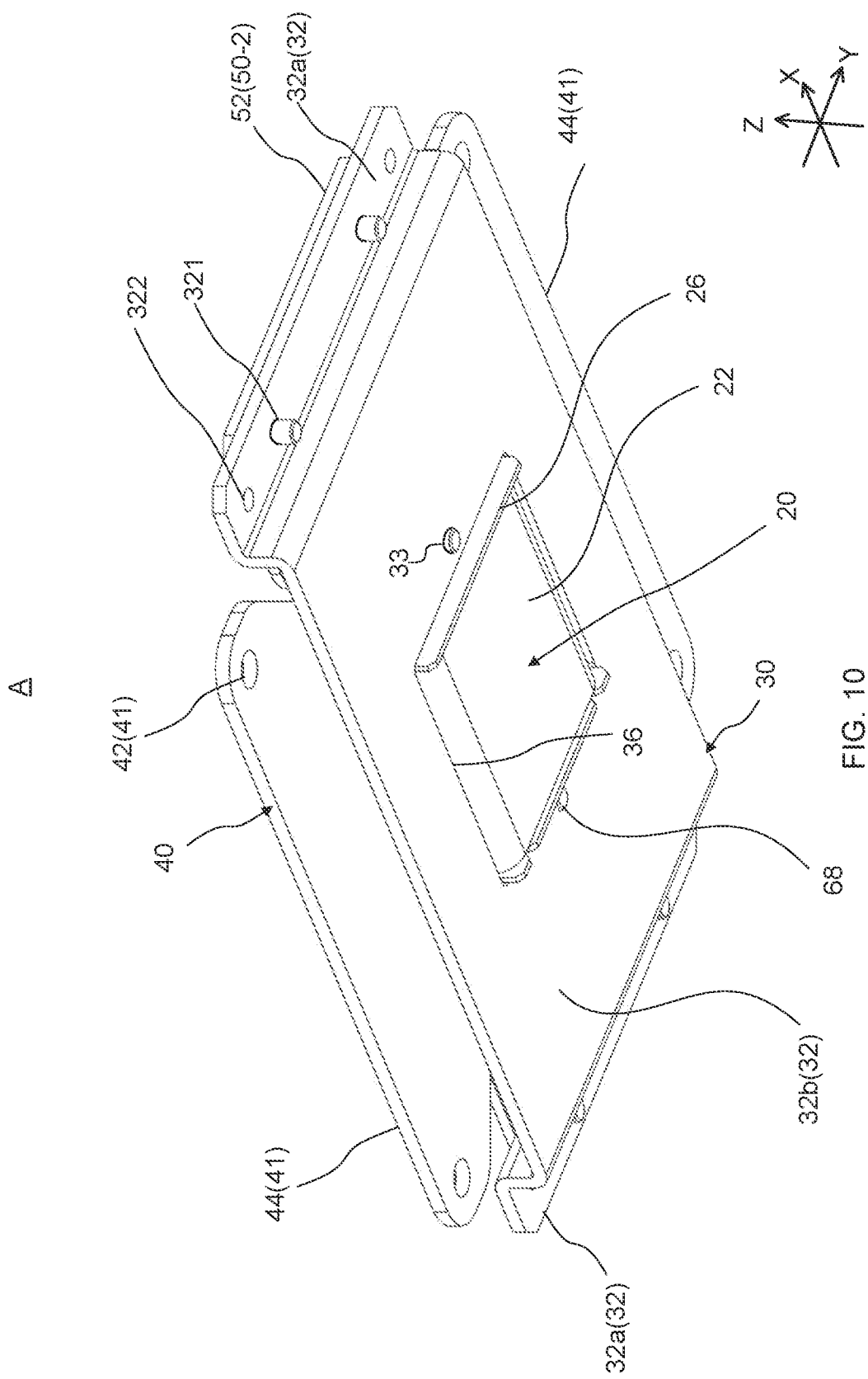
FIG. 10 is a rear perspective view of the same actuator main body.
Figure 11:
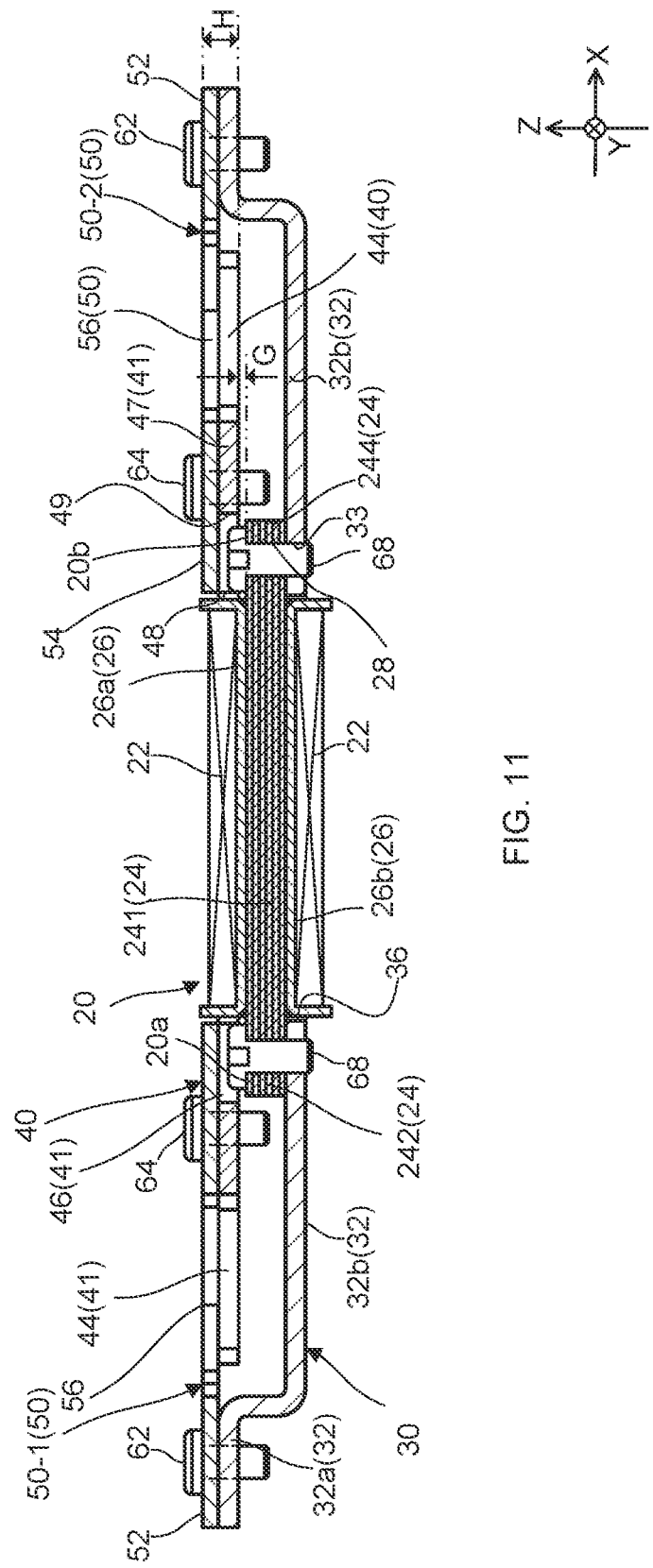
FIG. 11 is a cross-sectional view taken along line B-B of FIG. 9.
Figure 12:
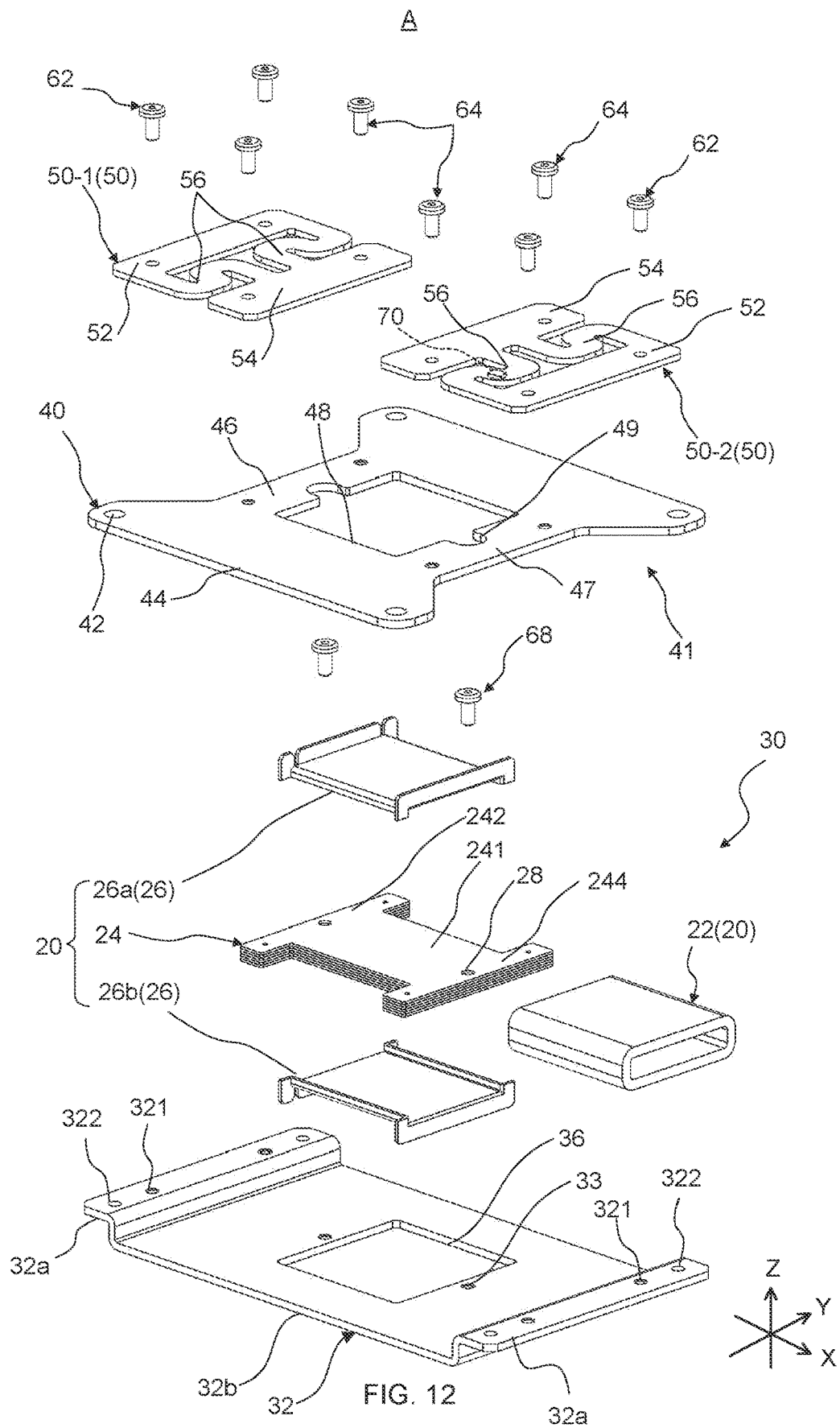
FIG. 12 is an exploded perspective view of the same actuator main body.

FIG. 9 is a front perspective view of actuator main body A of the vibration actuator according to the embodiment of the present invention, and FIG. 10 is a rear perspective view of actuator main body A. FIG. 11 is a sectional view taken along line B-B of FIG. 9, and FIG. 12 is an exploded perspective view of actuator main body A.

In the present embodiment, actuator main body A shown in FIGS. 9 to 12 is mounted on vibration presenting apparatus (electronic apparatus) 200 together with control unit 1, and functions as a vibration generating source of touch panel 2 (see FIG. 1) which is an example of an operation device.

Actuator main body A drives movable part 40 in one direction to move movable part 40 in the direction opposite to the one direction by an urging force of the members (plate-shaped elastic parts 50) for generating the urging force. This allows actuator main body A to function as an electromagnetically driven electromagnetic actuator to move movable part 40 in a linear reciprocating motion (vibration).

It allows the operator who touches touch panel 2 to perform intuitive operations by transmitting vibrations to the operator to feel bodily sensations in response to touch operations by the operator on screen 2a of touch panel 2. For example, touch panel 2 includes a touch position output part that receives a touch operation of the operator on touch panel 2 and outputs the touch position thereof. In this case, control unit 1 outputs an actuator drive signal and supplies a drive current to actuator main body A so that vibrations corresponding to the touch operations are generated based on a touch position information output by the touch position output part and a drive timing.

Actuator main body A that receives the driving current from control unit 1 generates vibrations corresponding to the touch positions output from touch panel 2 and transmits the vibrations to touch panel 2 to directly vibrate touch panel 2. In this way, the operation of the operator received by touch panel 2 is received, and actuator main body A is driven correspondingly thereto.

By being input the actuator drive signal via control unit 1, actuator main body A moves movable part 40 in one direction against the urging force, for example, the minus side in Z direction. Further, by being stopped the input of the actuator drive signal to actuator main body A, actuator main body A releases the urging force, and moves movable part 40 in the other direction (the plus side in Z direction) by the urging force. Actuator main body A vibrates movable part 40 and the operation device by inputting and stopping the actuator drive signal. Actuator main body A drives movable part 40 without using a magnet, and vibrates the operation device.

Note that, in the present embodiment, the actuator drive signal corresponds to a plurality of driving current pulses (also referred to as "current pulse") supplied to coil 22 as a driving current for driving movable part 40 and the operation device. In actuator main body A, movable part 40 moves in one direction when the current pulse is supplied to coil 22. By repeating this, movable part 40 vibrates.

Actuator main body A includes fixing part 30 having base part 32 and core assembly 20 formed by winding coil 22 around core 24; movable part 40 having yoke 41 of the magnetic material; and plate-shaped elastic parts 50 (50-1, 50-2) as elastic support parts. Plate-shaped elastic parts 50 (50-1, 50-2) elastically support movable part 40 to be movable in the vibrating direction with respect to fixing part 30. Note that, although plate-shaped elastic parts 50 are used as the elastic support parts, the elastic support parts may not be plate-shaped as long as the elastic support parts elastically support movable part 40 movably in the vibration direction with respect to fixing part 30.

Actuator main body A drives movable part 40 which is movably supported by plate-shaped elastic parts 50 so as to move in one direction with respect to fixing part 30. Further, the movement of movable part 40 in the direction opposite to the one direction is performed by the urging force of plate-shaped elastic parts 50.

Specifically, actuator main body A vibrates yoke 41 of movable part 40 by core assembly 20. Specifically, movable part 40 is vibrated with the attraction force of energized coil 22 and excited core 24 by energized coil 22 as well as the urging force by plate-shaped elastic parts 50 (50-1, 50-2).

Actuator main body A is formed in a flat shape having the Z direction as the thickness direction. Actuator main body A vibrates movable part 40 in the Z direction, i.e., the thickness direction as the vibrating direction with respect to fixing part 30, thereby bringing closer or away one of front and back surfaces spaced apart from each other in the thickness direction of actuator main body A itself with respect to the other surface in the Z direction.

In the present embodiment, actuator main body A moves movable part 40 to the minus side in Z direction as the one direction by the attraction force of core 24, and moves movable part 40 to the plus side in Z direction by the urging force of plate-shaped elastic parts 50 (50-1, 50-2).

In actuator main body A of the present embodiment, movable part 40 is elastically supported by a plurality of plate-shaped elastic parts 50 (50-1, 50-2) that is disposed along the direction orthogonal to the Z direction at point symmetrical positions with respect to the moving center of movable part 40. However, the configuration is not limited thereto.

Plate-shaped elastic parts 50 are fixed between movable part 40 and fixing part 30, includes an elastically deformable meander-shaped part, and elastically supports movable part 40 with respect to fixing part 30 to be movable in the direction opposing to at least one end of both ends (magnetic pole parts 242, 244) of core 24. As long as plate-shaped elastic parts 50 have such a configuration, plate-shaped elastic parts 50 may be provided in any way. For example, plate-shaped elastic parts 50 may elastically support movable part 40 with respect to fixing part 30 (core assembly 20) to be movable in the direction opposing to one end (magnetic pole part 242 or magnetic pole part 244) of core 24. Further, plate-shaped elastic parts 50-1, 50-2 may be disposed line symmetrically with respect to the center (the moving center) of movable part 40, and two or more plate-shaped elastic parts 50 may be used. Each of plate-shaped elastic parts 50-1 and 50-2 are fixed to fixing part 30 at one end side and fixed to movable part 40 at the other end side to movably support movable part 40 with respect to fixing part 30 in the vibrating direction (Z direction, and it is up-and-down direction herein).

In the present embodiment, actuator main body A detects the displacement of touch panel 2 subjected to the pressing operation as the strain of strain generating member 9 by strain detection sensors 70-1 to 70-4 as the strain detection units. Actuator main body A moves and vibrates movable part 40 in accordance with the detected strain.

<Fixing Part 30>

As shown in FIGS. 9 to 12, fixing part 30 includes core assembly 20 having coil 22 and core 24, and base part 32.

Core assembly 20 is fixed to base part 32. Base part 32 is connected to movable part 40 via plate-shaped elastic parts 50 (50-1, 50-2), and supports movable part 40 to be movable in the vibrating direction. Base part 32 is a flat-shape member, and forms the bottom surface of actuator main body A, in other words, the bottom surface of vibration actuator 10.

Base part 32 includes attaching parts 32a to which one end of each of plate-shaped elastic parts (50-1, 50-2) are fixed so as to sandwich core assembly 20. Each of attaching parts 32a is disposed with a same space provided from core assembly 20. Note that the space is a space to be a deforming area of plate-shaped elastic parts 50 (50-1, 50-2).

As shown in FIGS. 10 and 12, attaching parts 32a include fixing holes 321 for fixing plate-shaped elastic parts 50 (50-1, 50-2) and fixing holes 322 for fixing base part 32 to the base side (not shown).

Fixing holes 322 are provided at both ends of attaching parts 32a so as to sandwich fixing holes 321, and communicate with cylindrical fixing legs 324 provided to protrude from the back surface side of attaching parts 32a. Thereby, base part 32 is entirely and stably fixed to the base (not shown) via fastening members which fits into fixing holes 322 via fixing leg portion 324.

In the present embodiment, base part 32 is formed by processing a sheet metal and configured such that one side part and the other side part as attaching parts 32a are spaced apart from each other in the width direction (X direction) with bottom surface part 32b interposed therebetween. A recessed part having bottom surface part 32b shorter in depth than that of attaching parts 32a is provided between attaching parts 32a. Inside the recessed part, that is, the space on the top surface side of bottom surface part 32b is for securing the elastic deforming area of plate-shaped elastic parts 50 (50-1, 50-2), and for securing a movable area of movable part 40 supported by plate-shaped elastic parts 50 (50-1, 50-2).

Bottom surface part 32b is a rectangular shape, opening part 36 is formed in the center thereof, and core assembly 20 is located inside opening part 36.

Opening part 36 is a shape corresponding to the shape of core assembly 20. Opening part 36 is formed in a square shape in the present embodiment. Thereby, entire actuator main body A can be shaped substantially into a square shape on a plan view by disposing core assembly 20 and movable part 40 in the center of actuator main body A. Note that opening part 36 may be a rectangular shape (including a square shape).

Split body 26b of bobbins 26 on the lower side of core assembly 20 and a lower-side part of coil 22 are inserted inside opening part 36, and fixed such that core 24 is located on bottom surface part 32*b* on a side view. Thereby, length (thickness) in the Z direction becomes decreased as compared with a configuration where core assembly 20 is attached on bottom surface part 32*b*. Further, core assembly 20 is fixed by screws 62 as the fastening members in a state in which a part of core assembly 20, here, a part of the bottom surface side of core assembly 20 is fitted into opening parts 36. Thereby, core assembly 20 is firmly fixed to bottom surface part 32*b* in a state in which core assembly 10 is not easily detached from the bottom surface part 32*b*.

Core assembly 20 is configured by winding coil 22 around circumference of core 24 via bobbins 26.

Core assembly 20 vibrates (linearly reciprocates in the Z direction) yoke 41 of movable part 40 in cooperation with plate-shaped elastic parts 50 (50-1, 50-2) when coil 22 is energized.

In the present embodiment, core assembly 20 is formed in a rectangular plate-shaped. Magnetic pole parts 242 and 244 are disposed in both side portions of the rectangular plate-shaped spaced from each other in the longitudinal direction.

Magnetic pole parts 242 and 244 are disposed so as to be able to oppose to attracted surface parts 46 and 47 of movable part 40 with gap G provided therebetween in the Z direction. In the present embodiment, counter surfaces (counter surface parts) 20*a*, 20*b* as the upper surfaces are diagonally adjacent to the back surfaces of attracted surface parts 46, 47 of yoke 41 in the vibrating direction (Z direction) of movable part 40.

As shown in FIGS. 9 to 11, core assembly 20 is fixed to base part 32 with a winding axis of coil 22 aligned toward the opposing direction (X direction perpendicular to the vibrating direction) of spaced attaching parts 32*a* in base part 32. In the present embodiment, core assembly 20 is disposed in the center of base part 32, specifically in the center of bottom surface part 32*b*.

As shown in FIGS. 10 to 12, core assembly 20 is fixed to bottom surface part 32*b* such that core 24 is located on the bottom surface over opening part 36 while being in parallel to bottom surface part 32*b*. Core assembly 20 is fixed in a state where coil 22 and the part (core main body 241) to which coil 22 is wound are located within opening part 36 of base part 32.

Specifically, core assembly 20 is fixed to bottom surface part 32*b* by fastening screws 68 as fastening members through fixing holes 28 and fastening holes 33 (see FIGS. 10 to 12) of bottom surface part 32*b* in a state where coil 22 is disposed in opening part 36. Core assembly 20 and bottom surface part 32*b* sandwich coil 22, and are joined by screws 68 as fastening members at both side parts of opening part 36 spaced from each other in the Y direction and magnetic pole parts 242, 244. Fastening points of screws 68 are at two points on the axial center of coil 22.

Coil 22 functions as a solenoid that is energized and generates a magnetic field at the time of driving actuator main body A. Coil 22 together with core 24 and movable part 40 forms a magnetic circuit (magnetic path) that attracts and moves movable part 40. Note that power is supplied to coil 22 from an external power source via control unit 1. For example, the power is supplied to coil 22 to drive actuator main body A by supplying a driving current from control unit 1 to actuator main body A.

Core 24 includes core main body 241 around which coil 22 is wound, and magnetic pole parts 242, 244 provided at both ends of core main body 241 and excited by energizing coil 22. Core 24 may be in any types of configuration as long as it is a configuration having the length with which the both ends can function as magnetic pole parts 242, 244 when coil 22 is energized. For example, while it is possible to employ a straight-type (I-type) flat plate shape, core 24 of the present embodiment is formed in an H-type flat plate shape on a plan view.

In the case of the I-type core, in the both ends (magnetic pole parts) of the I-type core, the area of surfaces (air gap side surfaces) of attracted surface parts 46, 47 side, facing each other with the gap (air gap) G, become narrower. Thereby, magnetic resistance in the magnetic circuit may be increased, so that the conversion efficiency may be deteriorated. Further, when bobbins 26 are attached to core 24, protruding parts that are positioned so that the bobbin in the longitudinal direction of core 24 does not come off from the longitudinal direction disappears or becomes smaller, so that it is necessary to provide the protruding parts separately. In the meantime, because core 24 is the H-type, the gap side surface in the both ends of core main body 241 can be expanded in the front-and-rear directions (Y directions) longer than the width of core main body 241 around which coil 22 is wound, thereby making it possible to decrease the magnetic resistance and improve the efficiency of the magnetic circuit. Further, positioning of coil 22 can be performed by simply fitting bobbins 26 between portions of magnetic pole parts 242, 244 extended out from core main body 241, so that it is unnecessary to separately provide a positioning member of bobbins 26 for core 24.

In core 24, magnetic pole parts 242 and 244 are provided at each of the both ends of plate-shaped core main body 241 around which coil 22 is wound by being projected toward the direction orthogonal to the winding axis of coil 22.

Core 24 is of a magnetic material made of a soft magnetic material or the like, and formed from, for example, a silicon steel sheet, permalloy, ferrite or the like. Further, core 24 may also be made of electromagnetic stainless steel, a sintered material, an MIM (metal injection mold) material, a laminated steel sheet, an electrogalvanized steel sheet (SECC), or the like.

Magnetic pole parts 242 and 244 are excited by energizing coil 22, attract and move yoke 41 of movable part 40 spaced in the vibrating direction (Z direction). Specifically, magnetic pole parts 242 and 244 attract, by a magnetic flux to be generated, attracted surface parts 46 and 47 of movable part 40 oppositely disposed via gap G.

In the present embodiment, magnetic pole parts 242 and 244 are plate-shaped bodies extended in the Y direction that is the vertical direction with respect to core main body 241 extended in the X direction. Magnetic pole parts 242 and 244 are lengthy in the Y direction, so that the area of counter surfaces 20*a* and 20*b* opposing to yoke 41 are wider than the configuration formed in the both ends of core main body 241.

Bobbins 26 are disposed to surround core main body 241 of core 24 in the direction orthogonal to the vibrating direction. Bobbins 26 are formed from a resin material, for example. This makes it possible to secure electrical insulation with other metallic members (for example, core 24), so that reliability as the electric circuit can be improved. By using a resin of high fluidity for the resin material, formability can be improved so that the thickness can be decreased while securing the strength of bobbins 26. Note that split bodies 26*a* and 26*b* are mounted so as to sandwich core main body 241, so that bobbins 26 are formed in a cylindrical shape that covers the periphery of core main body 241. In bobbins 26, a flange is provided to the both ends of the cylindrical body so that coil 22 is defined so as to be located on the outer circumference of core main body 241.

<Movable Part 40>

Movable part 40 is disposed to oppose to core assembly 20 with gap provided therebetween in the direction orthogonal to the vibrating direction (Z direction). Movable part 40 is provided to be able to reciprocally vibrate in the vibrating direction with respect to core assembly 20.

Movable part 40 includes yoke 41, and includes movable-part side fixing parts 54 of plate-shaped elastic parts 50-1 and 50-2 fixed to yoke 41.

Movable part 40 is disposed in a state (standard normal position) being hanged while being spaced substantially in parallel and to be movable in the approaching/leaving directions (Z directions) with respect to bottom surface part 32b via plate-shaped elastic parts 50 (50-1, 50-2).

Yoke 41 is a magnetic path of the magnetic flux generated when coil 22 is energized, and is a plate-shaped body made of a magnetic material such as electromagnetic stainless steel, a sintered material, an MIM (metal injection mold) material, a laminated steel sheet, an electrogalvanized steel sheet (SECC), or the like. In the present embodiment, yoke 41 is formed by processing an SECC sheet.

Yoke 41 is hanged to oppose to core assembly 20 with gap G (see FIG. 11) provided therebetween in the vibrating direction (Z direction) by plate-shaped elastic parts 50 (50-1, 50-2) respectively fixed to attracted surface parts 46 and 47 spaced from each other in the X direction.

Yoke 41 includes surface-part fixing parts 44 fixed to strain generating member 9, and attracted surface parts 46 and 47 oppositely disposed to magnetic pole parts 242 and 244, in order to be attached to the operation device (see touch panel 2 shown in FIG. 1). Yoke 41 is formed in a rectangular frame shape having opening part 48 in the center thereof, by surface-part fixing parts 44 and attracted surface parts 46, 47.

Opening part 48 opposes to coil 22. In the present embodiment, opening part 48 is located right above coil 22, and the opening shape of opening part 48 is a shape to which coil 22 part of core assembly 20 can be inserted when yoke 41 moves to bottom surface part 32b side.

By configuring yoke 41 to have opening part 48, the thickness of actuator main body A, and hence entire vibration actuator 10, can be decreased as compared to a case having no opening part 48.

Further, core assembly 20 is located within opening part 48, so that yoke 41 is not disposed in the vicinity of coil 22. Therefore, it is possible to suppress deterioration in the conversion efficiency due to the magnetic flux leakage leaked from coil 22, so that high output can be achieved.

Surface-part fixing part 44 includes fixing surfaces 44a fixed to body frame parts 95a of strain generating member 9. Surface-part fixing part 44 has a plate shape. In the present embodiment, surface-part fixing part 44 is disposed to face touch panel 2 at a portion surrounding the center of the operation surface of touch panel 2, and is fixed to touch panel 2 via strain generating member 9.

Specifically, the edge part of fixing surface 44a of surface-part fixing part 44 is fixed in surface contact with the long side part of body frame parts 95a of strain generating member 9. In the present embodiment, fixing surface 44a has a trapezoidal shape in a plan view, and is fixed to strain generating member 9 via fastening members such as screws 69 (see FIGS. 4 to 6) inserted into surface-part fixing holes 42.

By joining surface-part fixing parts 44 to touch panel 2 via strain generating member 9, the center extending in the vibration direction (Z direction) of movable part 40 is preferably disposed so as to be positioned on the same line as the center of the operation surface of touch panel 2. Thus, the entire front surface of movable part 40 can receive the displacement of touch panel 2 via strain generating member 9.

In the present embodiment, in a front view of movable part 40, surface-part fixing holes 42 are provided at or near part which is the outside around core assembly 20 and on a diagonal line.

Attracted surface parts 46 and 47 are attracted to magnetic pole parts 242 and 244 magnetized in core assembly 20, and plate-shaped elastic parts 50 (50-1, 50-2) are fixed thereto.

Movable-part side fixing parts 54 of plate-shaped elastic parts 50-1 and 50-2 are fixed by being laminated, respectively, on attracted surface parts 46 and 47. Attracted surface parts 46 and 47 are provided with cutouts 49 escaping from the heads of screws 68 of core assembly 20 when moved to bottom surface part 32b side.

Thereby, even when movable part 40 moves to bottom surface part 32b side and attracted surface parts 46, 47 approach magnetic pole parts 242, 244, attracted surface parts 46, 47 are not to be in contact with screws 68 that fix magnetic pole parts 242, 244 to bottom surface part 32b, so that a movable area of yoke 41 in the Z direction can be secured for that.

<Plate-Shaped Elastic Part 50 (50-1, 50-2)>

Plate-shaped elastic parts 50 (50-1, 50-2) movably support movable part 40 with respect to fixing part 30. Plate-shaped elastic parts 50 (50-1, 50-2) support the upper surface of movable part 40 so as to be parallel to each other at the same depth as the upper surface of fixing part 30, or at the lower surface side of the upper surface of fixing part 30 (the upper surface of core assembly 20 in this embodiment). Plate-shaped elastic parts 50-1 and 50-2 have a symmetrical shape with respect to the center of movable part 40, and are members formed in the same manner in the present embodiment.

Plate-shaped elastic parts 50 are arranged yoke 41 substantially in parallel so as to face to magnetic pole parts 242 and 244 of core 24 of fixing part 30 with a gap G. Plate-shaped elastic parts 50 movably support the lower surface of movable part 40 in the vibrating direction at the position of bottom surface part 32b side of the substantially same depth level as the depth level of the upper surface of core assembly 20.

Plate-shaped elastic part 50 is a plate spring (spring plate member), and includes fixing-part side fixing part 52, movable-part side fixing part 54, and meander-shaped elastic arm parts 56 that communicate fixing-part side fixing part 52 with movable-part side fixing part 54.

Plate-shaped elastic part 50 attaches fixing-part side fixing part 52 to the surface of attaching parts 32a, attaches movable-part side fixing parts 54 to the surfaces of the attracted surface parts 46 and 47 of yoke 41, and attaches movable part 40 with meander-shaped elastic arm parts 56 parallel to bottom surface part 32b.

Fixing-part side fixing parts 52 are joined and fixed by screws 62 in surface contact with attaching parts 32a, and movable-part side fixing parts 54 are joined and fixed by screws 64 in surface contact with the attracted surface parts 46 and 47.

Meander-shaped elastic arm part 56 is an arm part having a meander-shaped part. Since meander-shaped elastic arm part 56 is the arm part having the meander-shaped part, meander-shaped elastic arm part 56 secures a length that allows deformation necessary for vibration of movable part 40 between fixing-part side fixing part 52 and movable-part side fixing part 54 and in a plane (a plane formed in the X direction and the Y direction) orthogonal to the vibration direction.

Meander-shaped elastic arm part 56 in the present embodiment has a shape which extends in the opposing direction of fixing-part side fixing parts 52 and movable-part side fixing parts 54 and folds back. In meander-shaped elastic arm part 56, ends respectively joined to fixing-part side fixing parts 52 and movable-part side fixing parts 54 are formed at positions shifted in the Y direction. Meander-shaped elastic arm parts 56 are disposed in a position of point symmetry or line symmetry with respect to the center of movable part 40.

Thereby, movable part 40 is supported from both sides by meander-shaped elastic arm parts 56 having meander-shaped springs, so that it is possible to disperse the stress at the time of elastic deformation. That is, plate-shaped elastic parts 50 can move movable part 40 in the vibrating direction (Z direction) without tilting with respect to core assembly 20, thereby making it possible to improve reliability of the vibrating state.

Each of plate-shaped elastic parts 50 includes at least two or more meander-shaped elastic arm parts 56. Thereby, compared to a case where each of plate-shaped elastic parts 50 includes only one meander-shaped elastic arm part, plate-shaped elastic parts 50 make it possible to improve the reliability by dispersing the stress at the time of elastic deformation and to improve the stability by balancing the support for movable part 40 better.

Plate-shaped elastic parts 50 in the present embodiment are formed from a magnetic material. Further, movable-part side fixing parts 54 of plate-shaped elastic parts 50 are disposed at positions opposing to both ends (magnetic pole parts 242, 244) of core 24 in a coil winding axis direction or on the upper side thereof and function as a magnetic path. In the present embodiment, movable-part side fixing parts 54 are fixed by being laminated on the upper side of the attracted surface parts 46 and 47. This makes it possible to increase thickness (Z direction, the length of the vibrating direction) H (see FIG. 11) of the attracted surface parts 46 and 47 opposing to the magnetic pole parts 242, 244 of core assembly as the thickness of the magnetic material.

In the present embodiment, the thickness of plate-shaped elastic parts 50 and the thickness of yoke 41 are the same, so that the cross sectional area of the magnetic material portion opposing to magnetic pole parts 242, 244 can be doubled. Thereby, compared to a case where the plate spring is nonmagnetic, it is possible to ease the degradation of properties due to magnetic saturation in magnetic circuits and to improve the output, by expanding the magnetic circuit.

Figure 13:
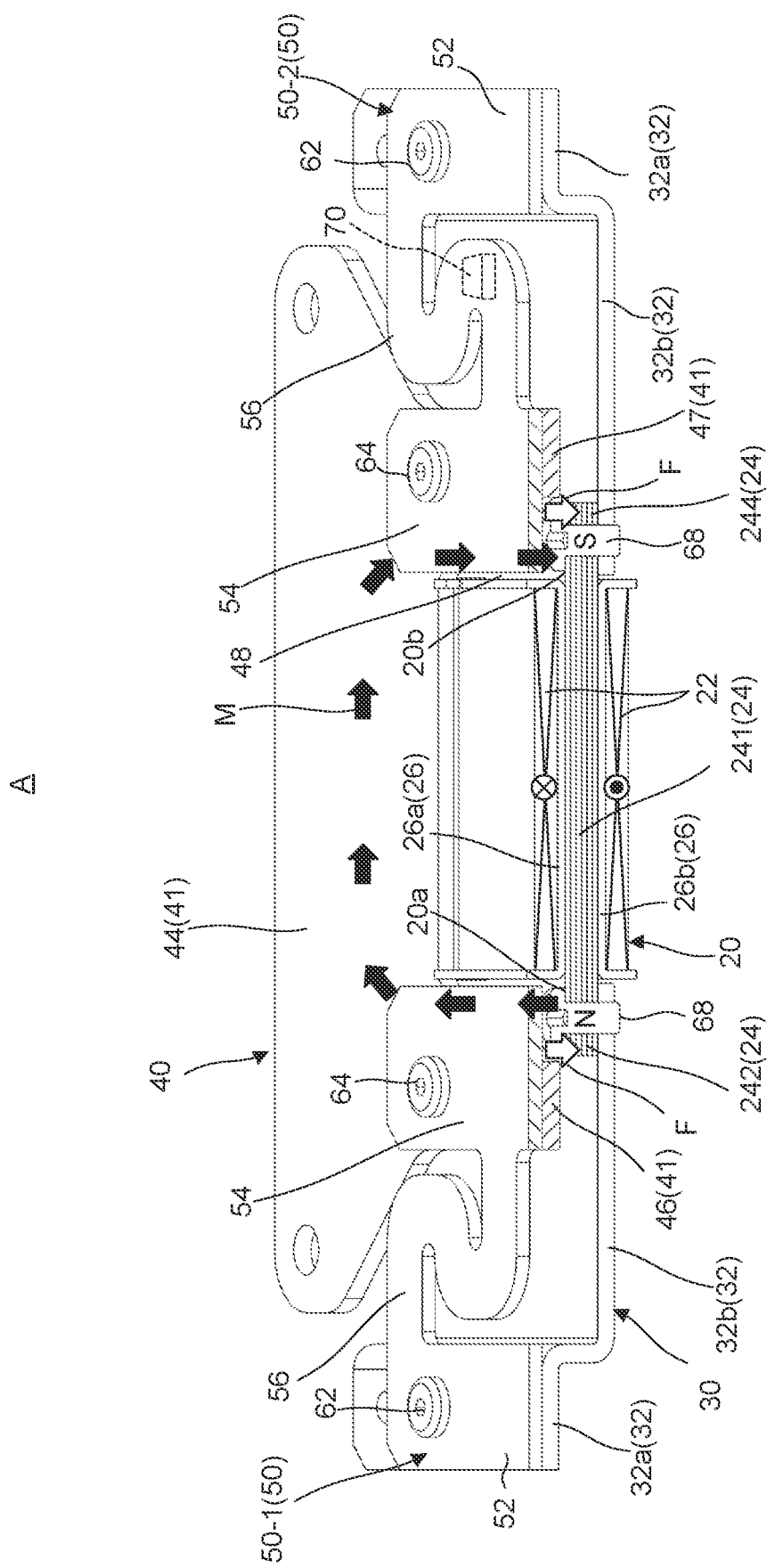
FIG. 13 is a view showing a magnetic circuit configuration of the same actuator main body.

FIG. 13 is a diagram showing a magnetic circuit of vibration actuator 10. Note that FIG. 13 is a perspective view of actuator main body A, showing the portion cut by the line B-B in FIG. 9. The portion of the magnetic circuit not shown has the same magnetic flux flow M as the portion of the magnetic circuit shown. Further, FIGS. 14A and 14B are a cross-sectional views schematically showing the movement of movable part 40 by the magnetic circuit. In particular, FIG. 14A is a diagram showing a state in which movable part 40 is held at a position separated from core assembly 20 by the plate-shaped elastic parts 50. FIG. 14B shows a movable part 40 which is moved is attracted to core assembly 20 side by the magnetomotive force by the magnetic circuit.

Specifically, when coil 22 is energized, core 24 is excited and a magnetic field is generated, thereby forming magnetic poles in both ends of core 24. For example, in FIG. 13, magnetic pole part 242 is the N-pole, and magnetic pole part 244 is the S-pole in core 24. Thereby, the magnetic circuit indicated by magnetic flux flow M is formed between core assembly 20 and yoke 41. Magnetic flux flow M in the magnetic circuit flows to attracted surface part 46 of opposing yoke 41 from magnetic pole part 242, passes through surface-part fixing parts 44 of yoke 41, and reaches magnetic pole part 244 opposing to attracted surface part 47 from attracted surface part 47. In the present embodiment, plate-shaped elastic parts 50 are also of magnetic materials. Thereby, the magnetic flux (illustrated as magnetic flux flow M) flown to attracted surface part 46 passes through attracted surface part 46 of yoke 41 and movable-part side fixing parts 54, reaching attracted surface part 46 and both ends of movable-part side fixing parts 54 of plate-shaped elastic part 50-2 via surface-part fixing parts 44 from both ends of attracted surface part 47.

Thereby, according to the principle of electromagnetic solenoid, magnetic pole parts 242, 244 of core assembly 20 generate attraction force F for attracting attracted surface parts 46, 47 of yoke 41. Thereupon, attracted surface parts 46, 47 of yoke 41 are attracted to both of magnetic pole parts 242, 244 of core assembly 20. Thereby, coil 22 is inserted into opening part 48 of yoke 41, and movable part 40 including yoke 41 moves in F-direction against the urging force of plate-shaped elastic parts 50 (see FIG. 14A and FIG. 14B).

In the meantime, when energization to coil 22 is stopped, the magnetic field disappears, attraction force F of core assembly 20 for movable part 40 is lost, and movable part 40 is moved back to the original position (moved to F-direction minus side) by the urging force of plate-shaped elastic parts 50.

By repeating such action described above, in actuator main body A, movable part 40 reciprocally moves in a linear manner and generates vibration in the vibrating direction (Z direction).

By reciprocating movable part 40 in a linear manner, touch panel 2 as the operation device to which movable part 40 is fixed, is also displaced in the Z direction following movable part 40. In the present embodiment, the displacement of movable part 40 due to driving, that is, the displacement of touch panel 2 ranges from 0.03 mm to 0.3 mm.

The range of this displacement is a range in which vibration corresponding to the display pressed by the operator can be applied on screen 2a of touch panel 2 as the operation device. For example, when the display to be pressed by the operator on screen 2a is a mechanical button or various switches, the range of amplitude is such that the same haptic feeling can be given as when the mechanical button or various switches are actually pressed. This range is set based on the fact that a small displacement of the amplitude of movable part 40 results in inadequate haptic feeling, and a large displacement of the amplitude of movable part 40 results in discomfort.

In actuator main body A, it is possible to increase the efficiency of the magnetic circuit and achieve high output by disposing attracted surface parts 46, 47 of yoke 41 adjacent to magnetic pole parts 242, 244 of core assembly 20. Further, actuator main body A uses no magnet, so that a low-cost configuration can be achieved.

Meander-shaped springs that are plate-shaped elastic parts 50 (50-1, 50-2) enable dispersion of the stress, so that the reliability can be improved. Especially, because movable part 40 is supported by a plurality of plate-shaped elastic parts 50 (50-1, 50-2), more effective dispersion of the stress is possible. Thus, actuator main body A is capable of providing a more direct sense of touch by driving up-and-down direction thereto to the operator who touches screen 2a in up-and-down direction.

Core assembly 20 having core 24 around which coil 22 is wound is fixed to fixing part 30. This core assembly 20 is disposed in opening part 48 of yoke 41 of movable part 40 which is movably supported in Z direction by plate-shaped elastic parts 50 with respect to fixing part 30. Thereby, it becomes unnecessary to stack members provided for each of the fixing part and movable part in Z direction (e.g., place the coil and magnet opposite each other in Z direction) in order to generate magnetism to drive the movable part in Z direction, so that the thickness in Z direction can be reduced in actuator main body A as the electromagnetic actuator. Further, by reciprocating linear movement of movable part 40, the operation device can give the vibration as the haptic feeling without using a magnet. Thus, the design becomes simple because the support structure is simple, it is possible to save space, it is possible to reduce the thickness of actuator main body A. Further, because it is not an actuator using a magnet, it is possible to reduce the cost as compared with the configuration using a magnet.

Hereinafter, the driving principle of actuator main body A will simply be described. Actuator main body A, that is, vibration actuator 10 can be driven by generating a resonance phenomenon with a pulse by using following motion expression and circuit expression. Note that the actions are not resonance driven but for expressing operational feeling of mechanical switches displayed on the touch panel. In the present embodiment, the actions are driven by inputting a plurality of current pulses through control unit 1.

Note that movable part 40 in actuator main body A performs reciprocating motion based on Expressions (1) and (2).

[Expression 1]

$$m\frac{d^2x(t)}{dt^2} = K_f i(t) - K_{sp}x(t) - D\frac{dx(t)}{dt} \quad (1)$$

m: Mass [kg]
x(t): Displacement [m]
$K_f$: Thrust constant [N/A]
i(t): Current [A]
$K_{sp}$: Spring constant [N/m]
D: Attenuation coefficient [N/(m/s)]

[Expression 2]

$$e(t) = Ri(t) + L\frac{di(t)}{dt} + K_e\frac{dx(t)}{dt} \quad (2)$$

e(t): Voltage [V]
R: Resistance [Ω]
L: Inductance [H]
$K_e$: Counter electromotive force constant [V/(rad/s)]

That is, mass "m" [kg], displacement "x(t)" [m], thrust constant "$K_f$" [N/A], current "i(t)" [A], spring constant "$K_{sp}$" [N/m], and attenuation coefficient "D" [N/(m/s)] in actuator main body A can be changed as appropriate within the range satisfying Expression (1). Also, voltage "e(t)" [V], resistance "R" [Ω], inductance "L" [H], and counter electromotive force constant "$K_e$" [V/(rad/s)] can be changed as appropriate within the range satisfying Expression (2).

Thus, actuator main body A is determined based on mass "m" of movable part 40, and spring constant $K_{sp}$ of metal springs (elastic bodies; plate springs in the present embodiment) as plate-shaped elastic parts 50.

Further, in actuator main body A, screws 62 and 64 as fastening members are used for fixing base part 32 and plate-shaped elastic parts 50 and for fixing plate-shaped elastic parts 50 and movable part 40. Thereby, plate-shaped elastic parts 50 required to be firmly fixed to fixing part 30 and movable part 40 for allowing movable part 40 to drive can be firmly fixed mechanically in a state capable of reworking.

According to actuator main body A, it includes fixing part 30 having coil 22 and core 24 around which coil 22 is wound and whose both ends protrude from coil 22. Further, vibration actuator 10 includes movable part 40 which is disposed close to counter surfaces 20a and 20b of magnetic pole parts 242 and 244, which are both end portions of core 24, with a gap G therebetween in a direction intersecting the winding shaft of coil 22, includes yoke 41 made of a magnetic body, and can be fixed to an operation touch surface portion operated by touch.

Actuator main body A is fixed between movable part 40 and fixing part 30, and elastically supports movable part 40 with respect to fixing part 30 so as to be movable in a direction facing magnetic pole parts 242 and 244, by plate-shaped elastic part 50 having meander-shaped elastic arm parts 56 to be elastically deformed. Thus, even in a case where actuator main body A is attached to the touch panel which is the operation touch surface portion, it is possible to provide the user with a suitable operation feeling at the time of operating the touch panel while achieving a reduction in thickness and cost.

<Control Unit 1>

Control unit 1 controls actuator main body A, and hence vibration actuator 10 that drives the operation device (touch panel 2 in FIG. 1) supported elastically to vibrate in one direction in the vibrating direction.

Control unit 1 supplies a driving current to vibration actuator 10 in response to the touch operation of the operation device to generate a magnetic field, and moves elastically vibratable movable part 40 in one direction with respect to fixing part 30, here in Z direction minus side. Thus, when the operator touches the operation device, control unit 1 gives vibrations as the haptic feeling. In the present embodiment, the touch operation is a signal detected by strain detection sensors 70, but in addition to this, the touch operation may be detected by using a signal detected by sensor 80. Alternatively, for example, the touch operation may be a signal indicating a touch condition input from touch panel 2.

In the present embodiment, control unit 1 supplies a single current pulse or a plurality of current pulses to coil 22 as an actuator drive signal for driving vibration actuator 10. In the present embodiment, the actuator drive signal is constituted by a train of a plurality of current pulses.

By supplying the current pulse to coil 22 by control unit 1, movable part 40 is displaced by the magnetic attraction force against the urging force of plate-shaped elastic parts 50, by being drawn back to coil 22 side, that is, to Z direction minus side. Following this, touch panel 2 also moves to Z direction minus side with respect to base (not shown) which fixing part 30 is fixed to.

Further, by stopping the supply of the driving current to coil 22, the urging force is released, a holding state of movable part 40 at a position in Z direction minus side relative to a standard position is released. Thereby, movable part 40 is urged to move from its maximum displacement position in Z direction minus side to the direction (Z direction plus side) opposite to the drawn direction (Z direction minus side) due to the urging force of the plate-shaped elastic parts 50, thus feeding back the vibration.

Control unit 1 is capable of generating various types of vibration shapes by the amplitude of each pulse in a single current pulse or a train of a plurality of current pulses, each wavelength, each supply timing, and the like, and supplying the vibration shapes to actuator main body A as actuator drive signals. Thus, the vibration of the actuator main body A is given to the operator as a feeling.

Control unit 1 includes, for example, a current pulse supply unit, a voltage pulse application unit.

The current pulse supply unit supplies a plurality of drive current pulses to coil 22 of vibration actuator 10 as a drive current for driving the operation device in response to a touch operation of the operation device (touch panel 2).

The voltage pulse application unit intermittently applies a plurality of control voltage pulses each generating a single current pulse or a train of a plurality of current pulses constituting the actuator drive signals to the current pulse supply unit.

Figure 15:
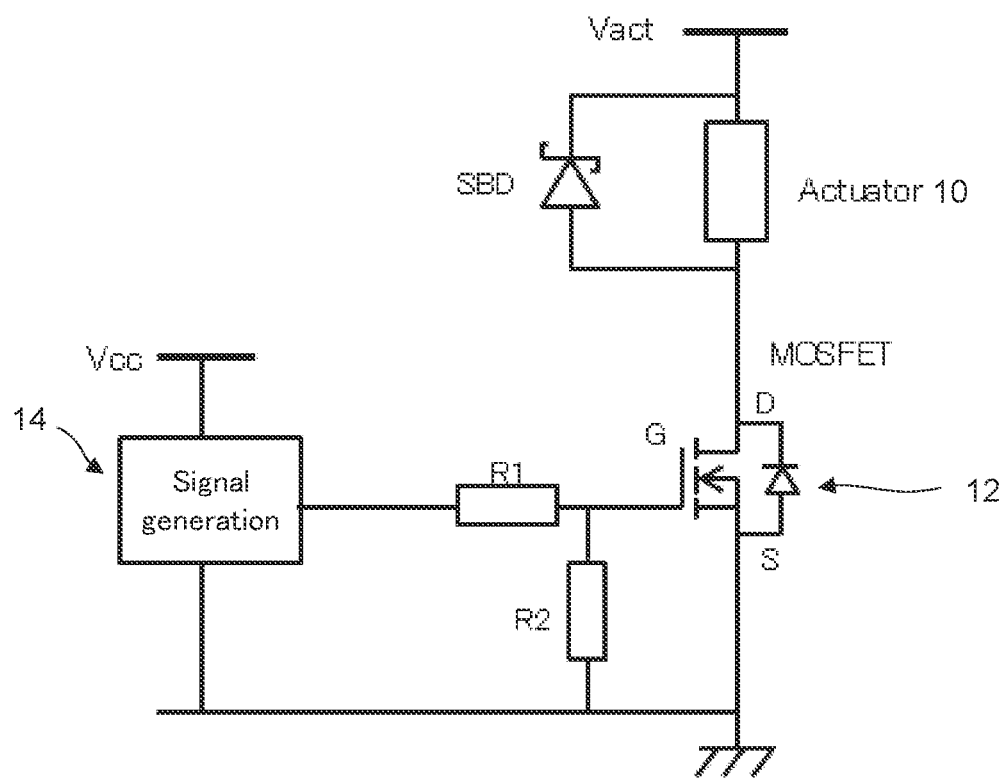
FIG. 15 is a view for explaining a control unit of the same actuator main body.

FIG. 15 is a view for explaining the control unit of the actuator main body and showing an example of a drive circuit for driving the vibration actuator.

In control unit 1 shown in FIG. 15, switching element 12 as a current pulse supply unit configured by a MOSFET (metal-oxide-semiconductor field-effect transistor), signal generating unit (Signal generation) 14 as a voltage pulse application unit, resistors R1, R2, and SBD (Schottky Barrier Diodes) are provided.

In control unit 1, signal generating unit 14 connected to a power supply voltage Vcc is connected to a gate of switching element 12. Switching element 12 is a discharge change-over switch. Switching element 12 is connected to vibration actuator 10 and SBD, and connected to vibration actuator 10, specifically, the actuator main body A (shown by [Actuator] in FIG. 15) to which a voltage is supplied from the power supply unit Vact.

Note that, although not shown, control unit 1 may include a CPU (Central Processing Unit), a ROM (Read Only Memory), a RAM (Random Access Memory), and the like for control operation of the components of the vibration presenting device. The CPU reads a program corresponding to processing content from the ROM, develops the program in the RAM, and cooperates with the developed program to control operation of the components of the vibration presenting device including vibration actuator 10. At this time, various data including various vibrations attenuation periods pattern stored in a storage unit (not shown) are referenced. The storage unit (not shown) may be configured by, for example, a nonvolatile semiconductor memory (so-called flash memory) or the like. For example, pulse waveform data of various plural patterns of a plurality of pulse trains is stored in the storage unit, ROM, RAM, or the like. The ROM stores various programs for control the vibration presenting device including a vibration presenting program for presenting vibration by driving actuator main body A. The vibration presentation program includes, for example, a program for reading pulse waveform data to generate an actuator drive signal that generates vibration corresponding to the touch information when information indicating a touch condition is input from strain detection sensors 70. Further, the vibration presentation program includes, for example, a program for generating an actuator drive signal corresponding to the touch information by combining the read data, and a program for supplying the generated actuator drive signal to the coil. The actuator drive signal is applied to coil 22 via a driver that drives actuator main body A as a combination of a plurality of current pulses. The CPU may use these programs and data to control the operation of the components of the vibration presenting device, and may control the current pulse supply unit and the voltage pulse application unit. For example, the signals from strain detection sensors 70-1 to 70-4 are amplified by the amplification unit, analog-to-digital converted by the conversion unit, and output to the CPU to vibrate vibration actuator 10 by the drive circuit shown in FIG. 15.

Control unit 1 supplies the current pulse to coil 22 to drive movable part 40 in one direction of vibration. By supplying the current pulse to coil 22, movable part 40 is displaced in one direction of the vibrating direction against the urging force of plate-shaped elastic parts 50. During the supply of the current pulse, the displacement in one direction of the vibrating direction of movable part 40 is continued. By stopping the supply of the current pulse, that is, turning off the input of the current pulse to coil 22, the force to displace in one direction of the vibration direction of movable part 40 (Z direction) is released. Turning off the input of the current pulse means that the timing in which the voltage generating the current pulse is turned off. At the moment the voltage is switched off, the current pulses are not completely switched off but attenuated.

Movable part 40 is displaced to move to the other direction (Z direction plus side) of the vibrating direction by the urging force of plate-shaped elastic parts 50 accumulated at the maximum displaceable position in the drawn direction (Z direction minus side). Strong vibration is propagated to the operation device through movable part 40 which has moved to the other direction side which is the operation device side, and the haptic feeling is given to the operator.

Control unit 1 supplies one or more current pulses to coil 22 in response to touching screen 2a by the operator based on the information from strain detection sensors 70. In the vibration of movable part 40, by supplying the first pulse, and further supplying the pulse after supplying the first pulse, control unit 1 adjusts the vibration or the like that remains and continues after stopping the supply of the first pulse.

<Load Detection Module K>

Returning to FIGS. 4 to 8, the load detection module K will be described.

Load detection module K is interposed between movable part 40 of actuator main body A and touch panel 2, and is fixed to movable part 40 and touch panel 2.

Load detection module K detects strain generated in strain generating member 9 by strain detection body 7 in accordance with pressing operation of touch panel 2. The detected strain is output to control unit 1, and control unit 1 drives actuator main body A in accordance with the strain to generate vibration.

<Strain Generating Member 9>

Strain generating member 9 includes movable-part side fixing parts (support-part side fixing parts) 92 fixed to surface-part fixing parts 44 of movable part 40, and presenting-unit side fixing parts 94 fixed to touch panel 2 as a vibration presenting unit.

Strain generating member 9 functions as a strain body that generates strain when an external force is applied by a pressing operation to touch panel 2. In the present embodiment, strain generating member 9 is formed in a rectangular frame-like plate shape by processing a sheet metal. This shape is a shape that a portion subjected to the pressing operation in touch panel 2 is surrounded at the back surface side of touch panel 2 when strain generating member 9 is fixed to planar touch panel 2. In the present embodiment, strain generating member 9 is formed of a sheet metal harder than plate-shaped elastic part 50 of movable part 40.

In strain generating member 9, connecting-arm parts 95b are provided so as to extend in the longitudinal direction from four corners of body frame parts 95a having a flat rectangular frame shape. Strain generating member 9 includes movable-part side fixing parts 92 provided at each part of body frame parts 95a to which the base end parts of connecting-arm parts 95b are connected. Strain generating member 9 is fixed to surface-part fixing parts 44 via movable-part side fixing parts 92. In strain generating member 9 of the present embodiment, body frame parts 95a are fixed to surface-part fixing parts 44 of movable part 40, and thus the function as a strain generating body is mainly exhibited by connecting-arm parts 95b. Strain generating member 9 includes presenting-unit side fixing parts 94 at each tip part of connecting-arm parts 95b, and is fixed to touch panel 2 by presenting-unit side fixing parts 94.

Strain generating member 9 includes ribs 95c provided vertically to body frame parts 95a along an outer edge part separated in the longitudinal direction of body frame parts 95a. Body frame parts 95a are in a state being reinforced by ribs 95c.

Strain generating member 9 is joined and fixed to touch panel 2 at presenting-unit side fixing parts 94, so that presenting-unit side fixing parts 94 are joined to touch panel 2 at a portion surrounding the center of the operation surface of touch panel 2. Further, strain generating member 9 is fixed to movable part 40 via movable-part side fixing parts 92 in an inner region surrounded by presenting-unit side fixing parts 94.

<Strain Detector 7>

Strain detector 7 is provided integrally with strain generating member 9, and has a strain detection part for detecting strain generated by a load applied to strain generating member 9 as the strain body in order to drive actuator main body A.

Strain detector 7 is, for example, a flexible printed circuit board (hereinafter, also referred to as "FPC") 72 on which a plurality of strain detection sensors 70 (70-1 to 70-4) as strain detection units is mounted.

Strain detection sensor 70 detects, as the pressing amount of touch panel 2, the pressing amount of strain generating member 9 that is displaced together with movable part 40 when touch panel 2 to which surface-part fixing parts 44 are fixed via strain generating member 9 is operated.

Strain detection sensors 70 (70-1 to 70-4) detect strain of strain generating member 9 due to deformation of plate-shaped elastic part 50 when the strain detection sensor is pushed into bottom surface part 32b side together with surface-part fixing parts 44. The detected strain is output to a control device or the like, and coil 22 is energized to move yoke 41 by attraction so that the moving amount of movable part 40 corresponds to the strain.

In the present embodiment, control unit 1 determines the moving amount of touch panel 2 by using the strain detected by strain detection sensors 70 to realize vibration feedback for the touch, but the present invention is not limited thereto. In addition, control unit 1 may be configured to detect the pressing amount against plate-shaped elastic part 50 by a moving amount corresponding to the actual moving amount of the operation device by using a sensor that detects touch of the operator with the operation device, and to realize expression of a more natural feeling by using the detection result.

Further, the vibration cycle of movable part 40 (which may include touch panel 2 as the operation device) when the drive current pulse is supplied by the current pulse supply unit of control unit 1 may be adjusted based on the detection result of the sensor that detects the touch operation of the operator, that is, the pressing amount of movable part 40, by using strain detection sensors 70. In addition to strain detection sensors 70, an operation signal indicating an operation state may be output to control unit 1 so that vibration corresponding to the display form is generated in conjunction with the display form of the touch position of the operator detected on touch panel 2, and control unit 1 may perform control in accordance with the operation signal.

Strain detector 7 mainly uses connecting-arm parts 95b of strain generating member 9 as a strain generating body, detects the strain, and outputs the detected strain to control unit 1.

Specifically, strain detector 7 includes FPC 72 disposed so as to extend over four corners of body frame parts 95a on body frame parts 95a of strain generating member 9, and formed in a staple-shaped (U-shaped). That is, FPC 72 is provided such that short parts 72b extend in the height direction perpendicularly to long parts 72a from both sides of long parts 72a extending in the width direction, and is formed in a U shape by long parts 72a and short parts 72b.

In strain detector 7, strain detection sensors 70-1 to 70-4 are disposed between movable-part side fixing parts 92 and presenting-unit side fixing parts 94, respectively. Specifically, strain detection sensors 70-1 to 70-4 are mounted on connecting-arm parts 95b functioning as the strain body, and detect strain in connecting-arm parts 95b of strain generating member 9, respectively.

Strain detection sensors 70-1 to 70-4 may be provided at one position in load detection module K, but are preferably provided at a plurality of positions. When vibration actuator 10 is attached to the vibration presenting unit (touch panel 2), it is preferable that strain detection sensors are provided at least three or more positions so as to radially surround the center of the operation surface of the vibration presenting unit at equal intervals. Thus, vibration actuator 10 can receive the displacement of touch panel 2 to be pressed by the surface and accurately detect the displacement.

In the present embodiment, strain detection sensors 70-1 to 70-4 are provided at 4 positions in the vicinity of presenting-unit side fixing parts 94 which is a fixing position to touch panel 2, and detect strain of a frame-shaped corner portion surrounding the center of the pressing operation region of touch panel 2. Therefore, when a rectangular touch panel display is used as the vibration presenting unit as in touch panel 2, actuator main body A can be attached to the display in a well-balanced manner via load detection module K. Thus, the strain direction of strain generating member 9 can be stably matched with the direction perpendicular to the surface.

Figure 16:
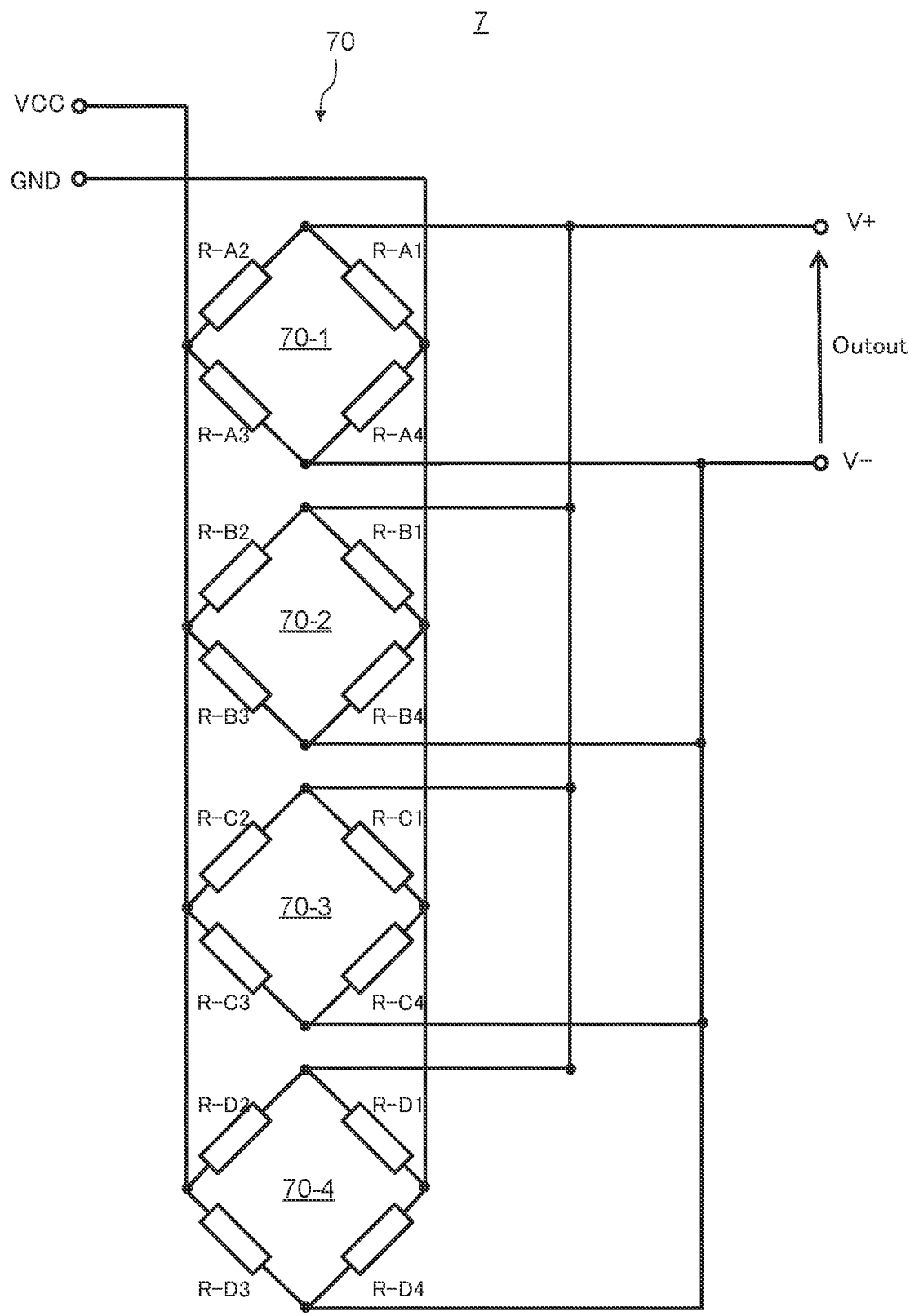
FIG. 16 is a diagram showing wiring of a strain detector.

FIG. 16 is a diagram showing wiring of strain detector 7.

Strain detection sensors 70-1 to 70-4 mounted on FPC 72 are disposed on strain generating member 9 and are located on the same plane.

Each of strain detection sensors 70-1 to 70-4 includes a plurality of strain gauge units (R-A1 to R-A4, R-B1 to R-B4, R-C1 to R-C4, and R-D1 to R-D4), and is a full-bridge connection type strain detection sensor.

In FPC 72, strain detection sensors 70-1 to 70-4 are connected in parallel to the power supply voltages Vcc and GND, are connected in parallel to each other, and are connected so as to output a change amount of an electrical resistance value that changes due to application of a load. Thus, the outputs from strain detection sensors 70-1 to 70-4 are averaged, and stable behavior is obtained. Further, the output values are substantially equalized in temperature for each of strain detection sensors 70-1 to 70-4, and the temperature stability can be improved.

<Effect of Vibration Actuator 10>

Effect 1

Strain detection sensors 70 are provided on connecting-arm parts 95b as the strain body whose strain is detected by strain detection sensors 70. That is, strain detection sensors 70 and the strain body are disposed between touch panel 2 as the vibration presenting unit and movable part 40, in other words, between movable-part side fixing parts 92 and presenting-unit side fixing parts 94.

Thus, strain detection sensors 70 are not disposed in actuator main body A, and the strain body is separated from plate-shaped elastic part 50, so that the strain detection object does not receive the mass of movable part 40 and the vibration specification of plate-shaped elastic part 50 is not affected. Thus, the design of actuator main body A does not become difficult, and various specifications of actuator main body A can be realized.

Further, in movable part 40, strain detection sensors 70 and the strain body are disposed between a fixing portion to plate-shaped elastic part 50 (corresponding to movable-part side fixing parts 92) and a fixing portion to the vibration presenting unit (corresponding to presenting-unit side fixing parts 94). Thus, strain detection sensors 70 and the strain body can be integrated with actuator main body A, and a product of the vibration actuator with complete haptic feeling expression can be realized.

Effect 2

Actuator main body A is fixed to touch panel 2, which is the vibration presenting unit, via load detection module K in which strain detection sensors 70 and strain generating member 9 are integrated. Thus, vibration actuator 10 can be assembled after load detection module K and actuator main body A are separately assembled. Thus, compared to a configuration in which strain detection sensors 70 and the strain body are a part of movable part of the actuator main body, it is not necessary to assemble the actuator after strain detection sensors 70 are assembled, or to perform reverse process, and therefore it is possible to improve assemblability.

Further, since strain generating member 9 can be changed in accordance with the shape of the vibration presenting unit, the degree of freedom in design can be improved.

Effect 3

Movable part 40 of actuator main body A is driven in a direction perpendicular to the surface of touch panel 2 to be the vibration presenting unit. Specifically, unlike a case where touch panel 2 as the vibration presenting unit is moved in a direction parallel to the screen (touch surface), touch panel 2 and movable part 40 are bent in the direction perpendicular to the surface by the load of the vibration actuator. Thus, for example, when the behavior of the switch is expressed, the deflection can also be expressed, and a realistic haptic expression close to the actual operation of the switch or the like can be realized.

Effect 4

Strain generating member 9 is a plate-shaped spring plate member. Thus, even when vibration is repeatedly given, metal fatigue can be mitigated and reliability can be improved.

Further, in vibration actuator 10, strain generating member 9 is formed of an integral spring plate member. Thus, it is possible to increase the positional accuracy of the arrangement positions of strain detection sensors 70-1 to 70-4 on connecting-arm parts 95b of strain generating member 9, and it is possible to improve the accuracy at the time of assembly. That is, unlike the case where connecting-arm parts 95b as the strain bodies to be the detection target portions in strain generating member 9 are configured to be separated into a plurality of parts, no variation occurs at the time of assembly, and the assemblability can be improved.

Stoppers 400 prevent touch panel 2 to which movable part 40 is fixed via load detection module K and fixing part 30 connected to movable part 40 via plate-shaped elastic part from being separated from each other by a predetermined interval or more. The predetermined interval is a length at which plate-shaped elastic part 50 and strain generating member 9 are not plastically deformed. Thus, stoppers 400 function when an external impact is applied to vibration actuator 10 to prevent a load from being applied to strain generating member 9, thereby capable of suppressing the plastic deformation of strain generating member 9, preventing strain generating member 9 and strain detection sensors 70 from being damaged, and improving reliability.

Effect 5

The present embodiment includes position detection unit 2b (see FIGS. 1 and 2) that detects the position of the finger of the operator who performs the pressing operation on screen 2a of touch panel 2 in a non-contact manner, specifically, by the capacitance with the finger of the operator. Position detection unit 2b has sensitivity of capacitance detection that reacts even when there is a distance between the finger and touch panel 2. That is, vibration presenting apparatus 200 can detect the position of the finger by position detection unit 2b even when the finger is in a floating state.

Figure 17:
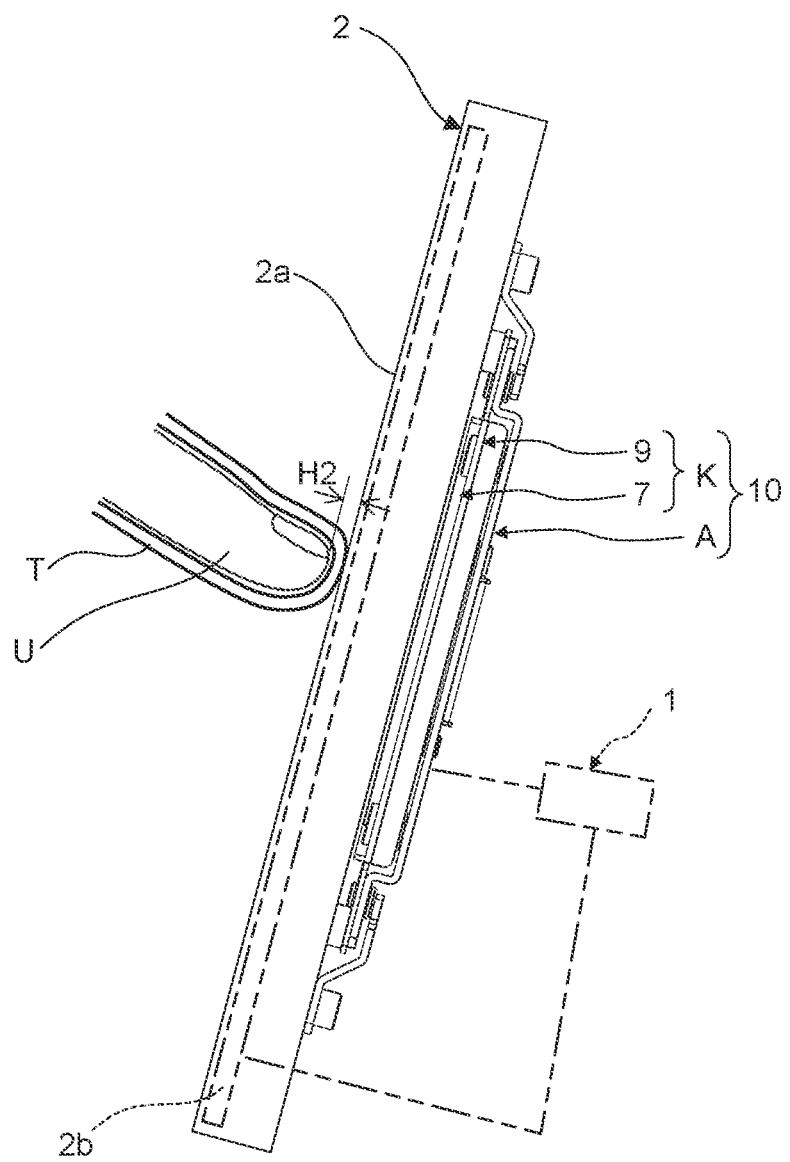
FIG. 17 is a diagram for explaining the operation of the vibration presenting apparatus having the vibration actuator according to Embodiment 1 of the present invention.

For example, as shown in FIG. 17, when vibration presenting apparatus 200 is operated by a finger U wearing a glove T, the finger U is in a floating state (hover state).

In a general structure in which a position of a finger operating a touch panel is detected using a capacitance sensor, a glove other than a glove dedicated to a finger on which the glove is worn does not respond to capacitance, and thus a distance between the finger and the touch panel is substantially long. This distance corresponds to distance H2 in FIG. 17.

In contrast, according to the present embodiment, position detection unit 2b detects the position of finger U even in a state in which finger U touches touch panel 2 via glove T (actually, a state in which finger U is pressed by the glove), that is, even in a state in which finger U is in a hover state. That is, vibration presenting apparatus 200 can detect the position of the operating finger by touch panel 2 which is the vibration presenting unit even in the case of an operation in a situation in which capacitance detection is impossible, such as an operation through glove T or the like.

In addition, vibration presenting apparatus 200 (which may be vibration actuator 10) detects the operation by the pressing operation with finger U wearing glove T, that is, detects that finger U is being pressed with the pressing load by strain detection sensors 70.

Thus, according to the present embodiment, it is possible to detect the position of finger U even in a state in which finger U is separated from screen 2a, accurately detect that finger U is pressed, and apply vibration feedback to touch panel 2 by the vibration of vibration actuator 10. Vibration presenting apparatus 200 can more effectively increase the operation feeling even in an operation with gloves. Further, by having a function of reacting even when there is a distance between finger U and touch panel 2 and a function of detecting that finger U is pressed by the detection of strain detection sensors 70, it is possible to suppress erroneous reaction and erroneous operation in the detection of the pressing operation.

Thus, vibration presenting apparatus 200 according to the present embodiment realizes a realistic haptic feeling expression such as the haptic feeling of a switch by a realistic haptic feeling expression based on load detection.

Embodiment 2

Figure 18:
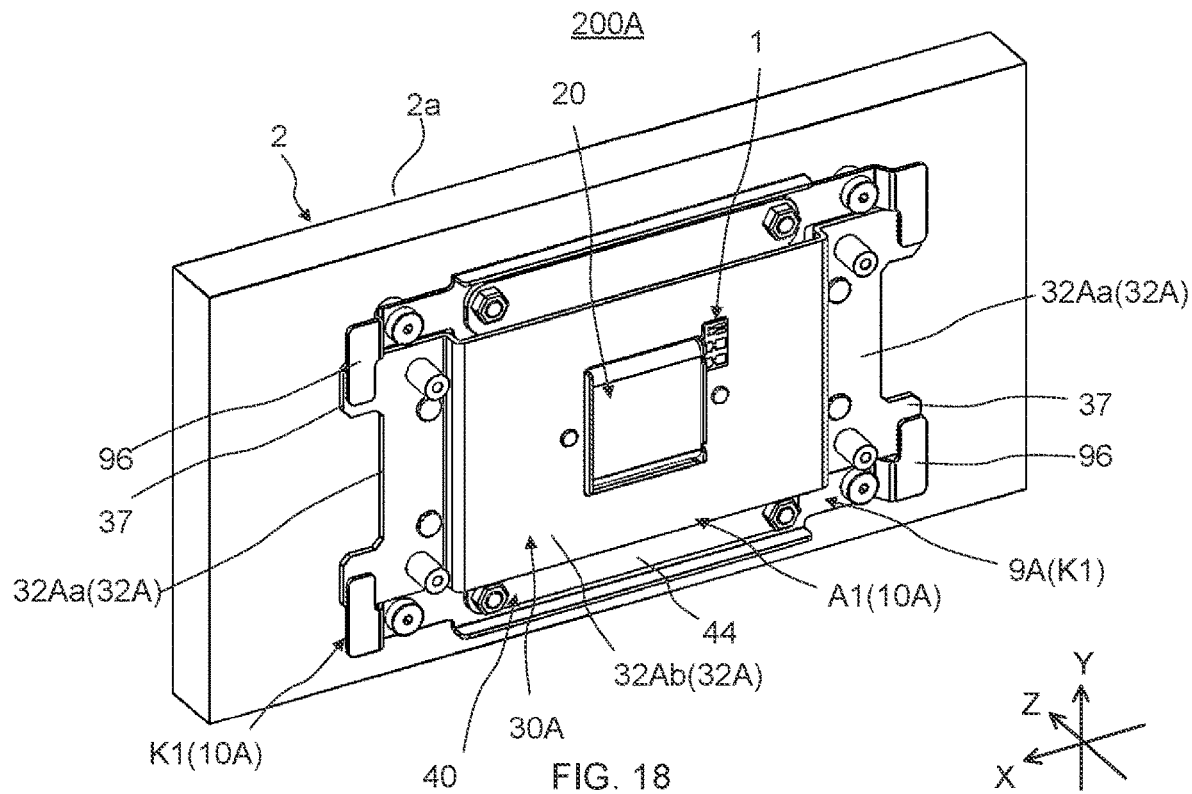
FIG. 18 is a rear perspective view of a vibration presenting apparatus having a vibration actuator according to Embodiment 2 of the present invention.
Figure 19:
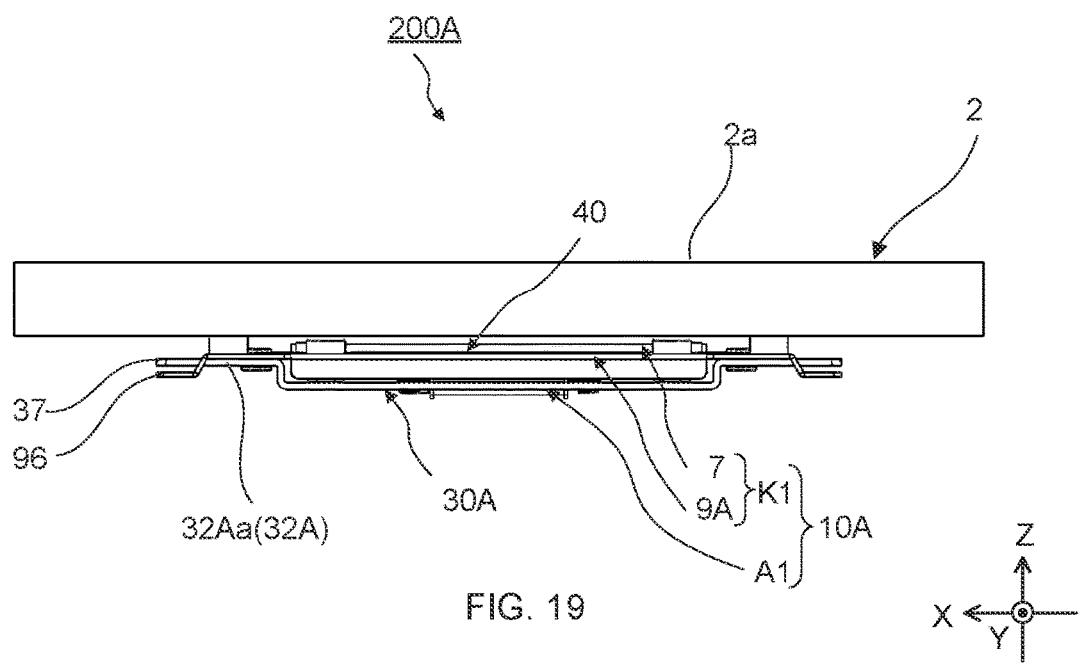
FIG. 19 is a plan view of the same vibration presenting apparatus.
Figure 20:
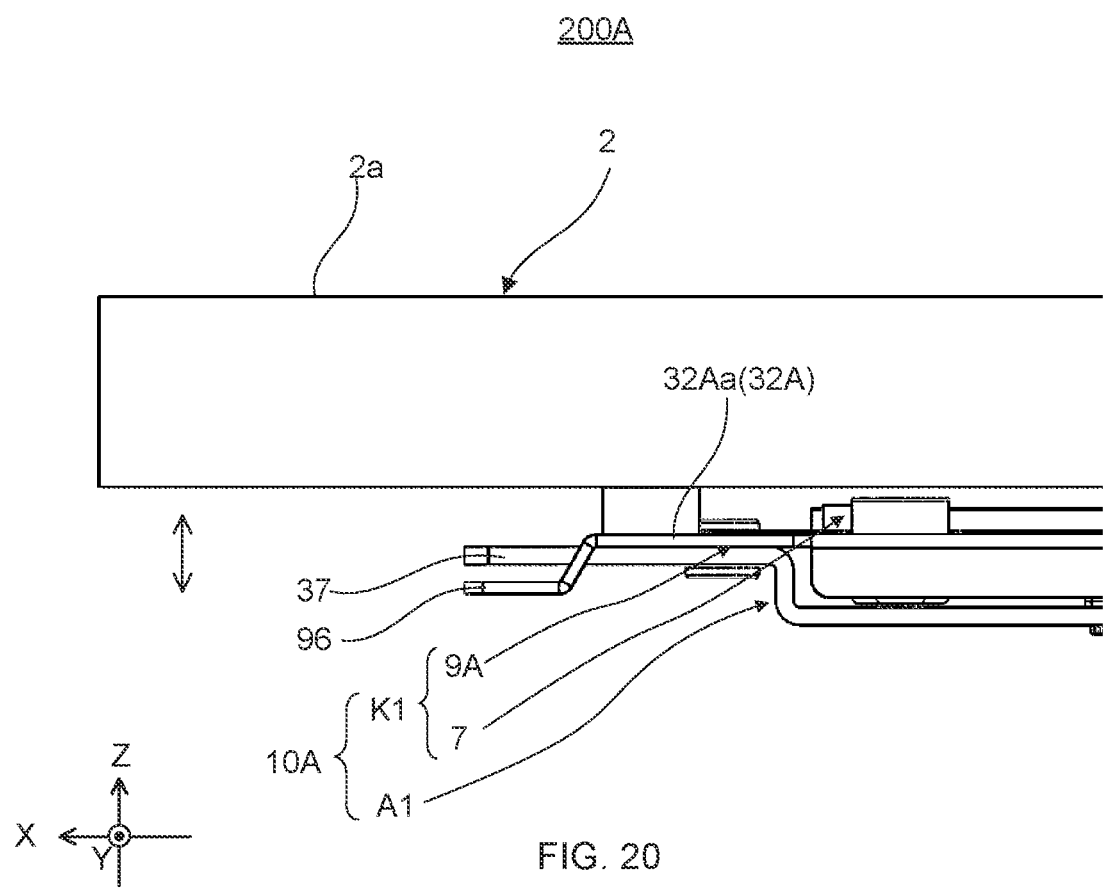
FIG. 20 is an enlarged view showing a stopper of a vibration actuator in the same vibration presenting apparatus.
Figure 21:
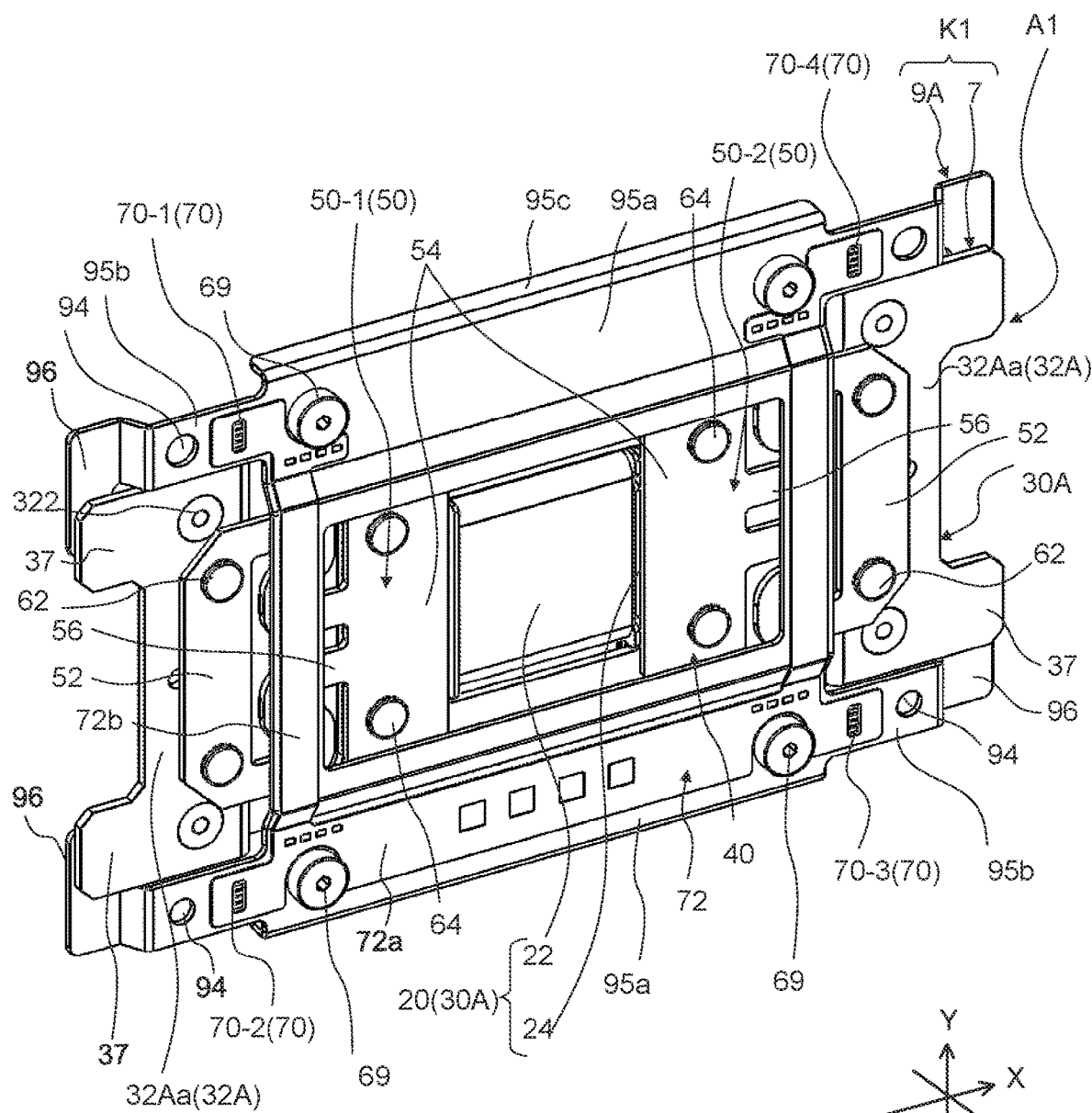
FIG. 21 is a front external perspective view of the same vibration actuator.
Figure 22:
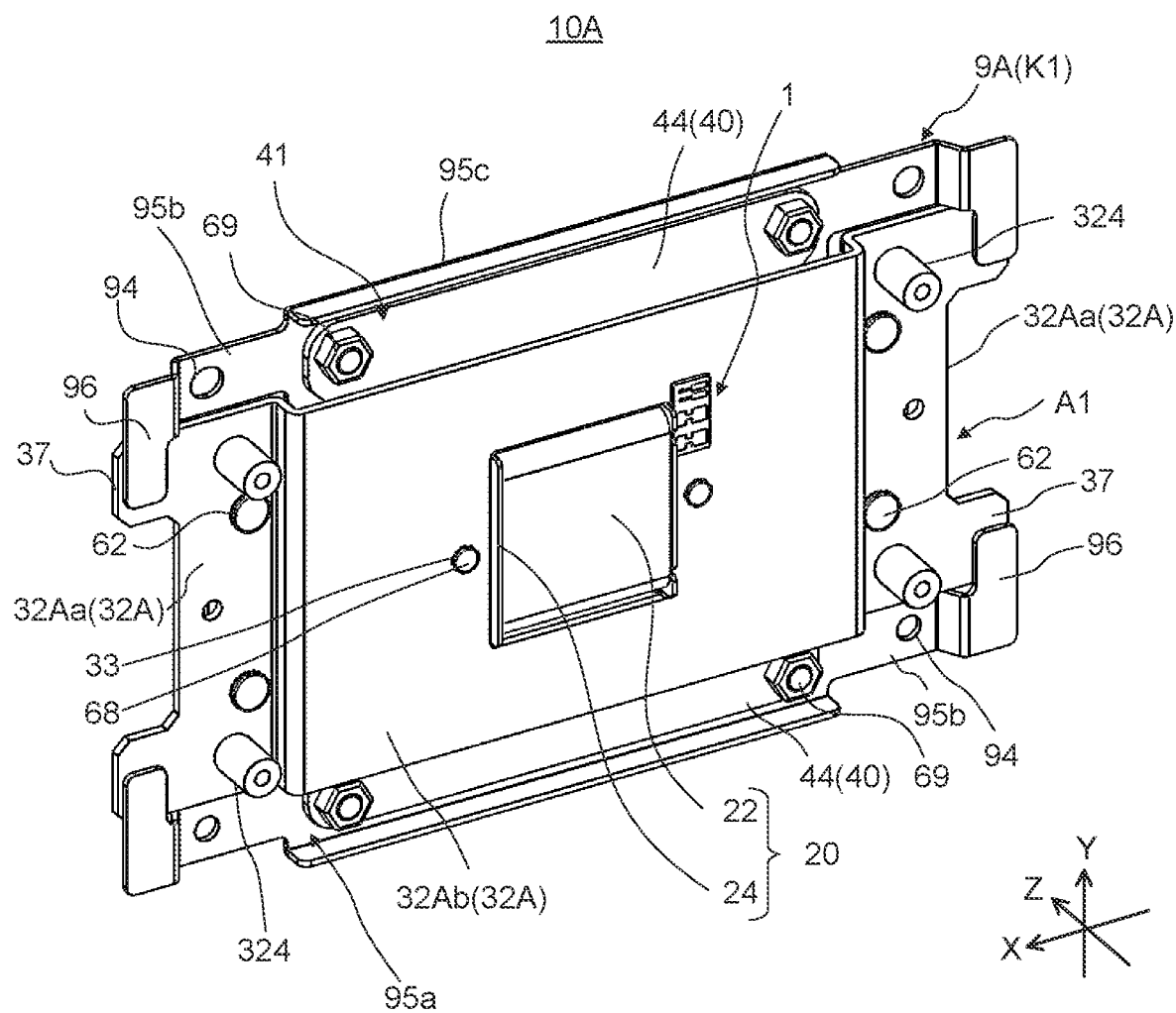
FIG. 22 is a rear external perspective view of the vibration actuator.
Figure 23:
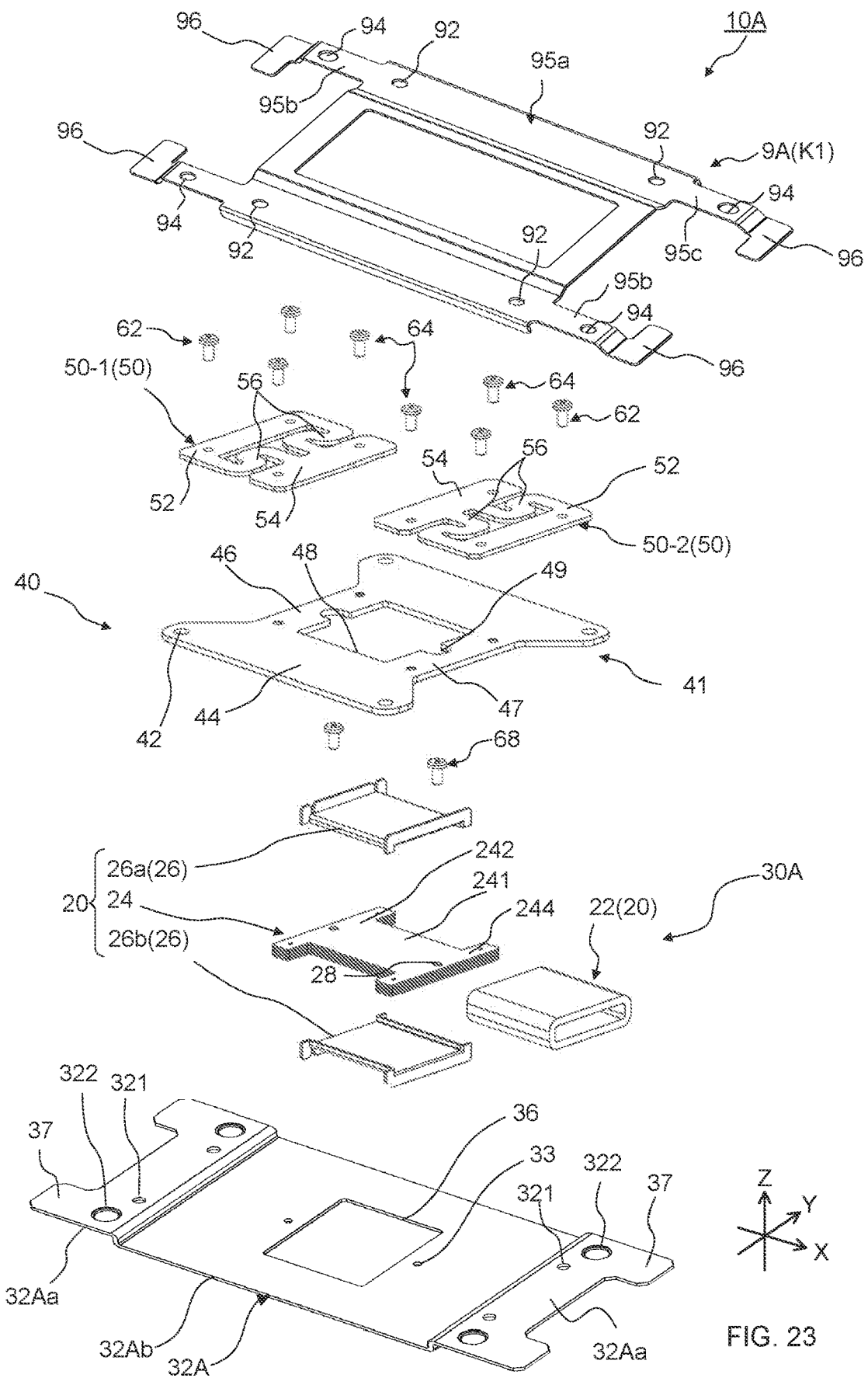
FIG. 23 is an exploded perspective view of the same vibration actuator.

FIG. 18 is a rear perspective view of vibration presenting apparatus 200A having a vibration actuator according to Embodiment 2 of the present invention, and FIG. 19 is a plan view of vibration presenting apparatus 200A. Further, FIG. 20 is an enlarged view showing a stopper of vibration actuator 10A in vibration presenting apparatus 200A. Further, FIGS. 21 to 23 are a front external perspective view, a rear external perspective view, and an exploded perspective view of vibration actuator 10A, respectively. Note that, in vibration actuator 10A shown in FIG. 23, for convenience, strain detector 7 of load detection module K1 has the same configuration as that of vibration actuator 10, and is provided on the strain generating member in the same manner, and thus is not shown. Further, FIG. 24 is a rear perspective view of strain generating member 9A, and FIG. 25 is a rear perspective view of the base part.

Vibration presenting apparatus 200A shown in FIGS. 18 to 20 is different from vibration presenting apparatus 200 of Embodiment 1 only in the configuration of vibration actuator 10A. Specifically, in vibration presenting apparatus 200A, the function of stopper 400 provided in touch panel 2 as the vibration presenting unit is provided in vibration actuator 10A of vibration presenting apparatus 200A. The other basic configuration of vibration presenting apparatus 200A is the same as the configuration of vibration presenting apparatus 200. Therefore, hereinafter, a configuration different from that of vibration presenting apparatus 200 will be described, and the same configuration will be denoted by the same reference numeral and description thereof will be omitted.

Vibration presenting apparatus 200A includes vibration actuator 10A and an operation device (touch panel 2 in the present embodiment) that is performed a touch operation by an operator.

In vibration presenting apparatus 200A, similarly to vibration presenting apparatus 200, when screen 2a of touch panel 2 is touched and operated by the finger pulp or the like of the operator, vibration actuator 10A is driven to vibrate in response to the operation. This vibration provides the operator with a touch operation feeling ("haptic feeling" or "force sense"). Similar to vibrating actuator 10, vibration actuator 10A of the present embodiment provides various types of haptic feelings corresponding to the display image operated by the operator. Note that touch panel 2 may be an operation device which does not have a display function and can be simply touched and operated by the operator.

Vibration actuator 10A is a plate-shaped vibration actuator, and is disposed so as to face the back surface side touch panel 2, that is, the surface on the opposite side of screen 2a which is the operation surface, in the thickness direction when the Z direction is the thickness direction.

Vibration actuator 10A includes actuator main body A1 having control unit 1 and load detection module K1.

Actuator main body A1 includes fixing part 30A having base part 32A and core assembly 20 formed by winding coil 22 around core 24; movable part 40 having yoke 41 made of a magnetic material; and plate-shaped elastic parts 50 (50-1, 50-2). Plate-shaped elastic parts 50 (50-1, 50-2) elastically support movable part 40 to be movable in the vibration direction with respect to fixing part 30A. Load detection module K1 includes strain generating member 9A and strain detector 7 provided to strain generating member 9. Vibration actuator 10A detects the displacement of strain generating member 9A when touch panel 2 is pressed. In the present embodiment, the strain is detected by strain detector 7, movable part 40 of actuator main body A1 vibrates in accordance with the detection result of strain detector 7 to give vibration to touch panel 2. Note that, actuator main body A1 has the same magnetic circuit as that of actuator main body A, and movable part 40 reciprocates by the driving principle based on the expressions (1) and (2) as in actuator main body A.

Compared to actuator main body A, actuator main body A1 shown in FIGS. 18 to 24 is different in that actuator main body A1 includes movement regulated parts 37; and movement regulating parts 96 which engage with each other in each of strain generating member 9A of load detection module K1 and base part 32A of fixing part 30.

Strain generating member 9A includes rectangular frame-shaped body frame parts 95a fixed to yoke 41 of movable part 40 of actuator main body A1; connecting-arm parts 95b extending from the corners of body frame parts 95a along the longitudinal direction; and movement regulating parts 96 provided on the tip side of connecting-arm parts 95b.

In the present embodiment, as shown in FIGS. 18 to 22, movement regulating parts 96 are provided at a position close to presenting-unit side fixing part 94 in connecting-arm parts 95b. Specifically, as shown in FIG. 20, movement regulating parts 96 extend in a direction orthogonal to the extending direction of connecting-arm parts 95b at a position that is further away from movable-part side fixing parts 92 than the position of presenting-unit side fixing part 94 on connecting-arm parts 95b. Movement regulating parts 96 are provided so as to be positioned on the rear surface side than attaching parts 32Aa of base part 32.

Similarly to base member 3, base part 32A is a long member having a rectangular flat shape. In the present embodiment, base part 32A is formed by processing a sheet metal and includes concave bottom surface part 32Ab provided with attaching parts 32Aa at both ends. Opening part 36A is provided in the center of bottom surface 32Ab, and core assembly 20 is disposed in opening part 36A. In attaching parts 32Aa, movement regulated parts 37 which are engaged with movement regulating parts 96 and regulates the movement in the opposite direction to each other, is protruded.

Movement regulated parts 37 are provided so as to protrude in the longitudinal direction from attaching parts 32Aa, and are provided so as to be positioned at positions overlapping movement regulating parts 96 of strain generating member 9A on a surface opposite to a surface on which strain generating member 9A is attached in the Z direction (vibration direction).

Therefore, when an impact is applied to vibration presenting apparatus 200A, touch panel 2 moves in the direction perpendicular to the surface, and strain generating member 9A moves toward touch panel 2, movement regulating parts 96 that move along with the movement of strain generating member 9A come into contact with movement regulated parts 37. Thus, the movement of movement regulating parts 96 are suppressed, the movement of strain generating member 9A itself is also suppressed, and the load is prevented from being applied to strain generating member 9A.

That is, in the movement of strain generating member 9A in the vibration direction when an impact is received in vibration presenting apparatus 200A, the movement toward fixing part 30A side (the minus side in the Z direction) is suppressed by the mutual components coming into contact with each other, such as screws 68 on fixing part 30A side coming into contact with yoke 41. On the other hand, the movement of strain generating member 9A toward fixing part 30A (the minus side in the Z direction) when an impact is received in vibration presenting apparatus 200A, is regulated by movement regulating parts 96 of strain generating member 9A engaging with movement regulated parts 37 on the back surface side of movement regulated parts 37.

Thus, the plastic deformation of strain generating member 9A is suppressed, the deformation of strain generating member 9A and its breakage are prevented, and the reliability is improved.

Therefore, compared to Embodiment 1, it is possible to manufacture vibration actuator 10A and vibration presenting apparatus 200A having impact resistance without providing a stopper function in touch panel 2 itself which is the vibration presenting unit to which vibration actuator 10A is attached. Further, according to vibration actuator 10A and vibration presenting apparatus 200A of Embodiment 2, it is possible to obtain the same effects as Effects 1 and 3 of Embodiment 1. Further, in the present embodiment, similarly to position detection unit 2b of touch panel 2 of vibration presenting apparatus 200, touch panel 2 may include a position detection unit that detects the position of the finger (pressing object) of the operator pressing screen 2a of touch panel 2 in a non-contact manner. Thus, it is possible to obtain the same effect as Effect 5 of Embodiment 1.

Embodiment 3

Figure 26:
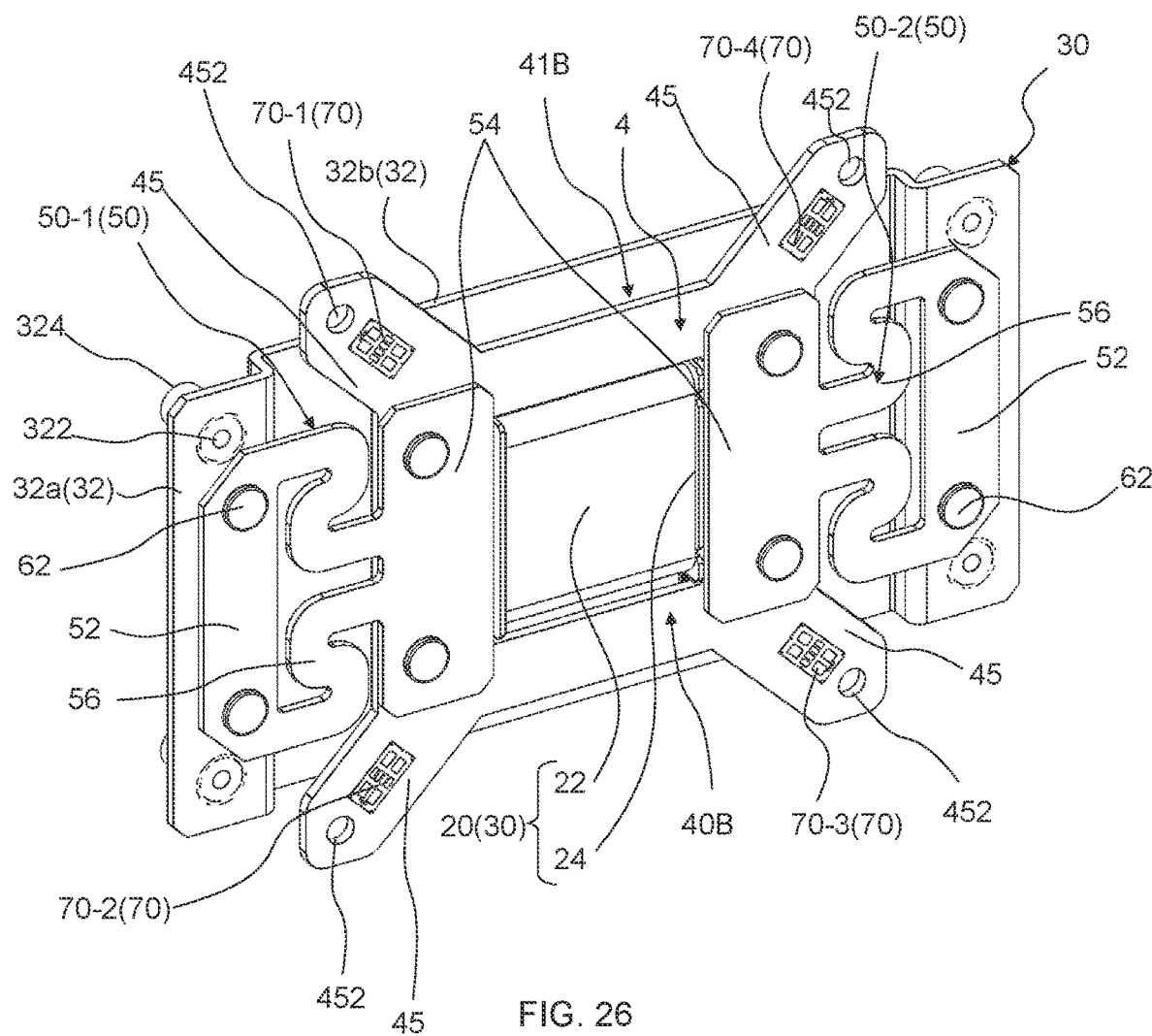
FIG. 26 is a front perspective view of a vibration actuator according to Embodiment 3 of the present invention.
Figure 27:
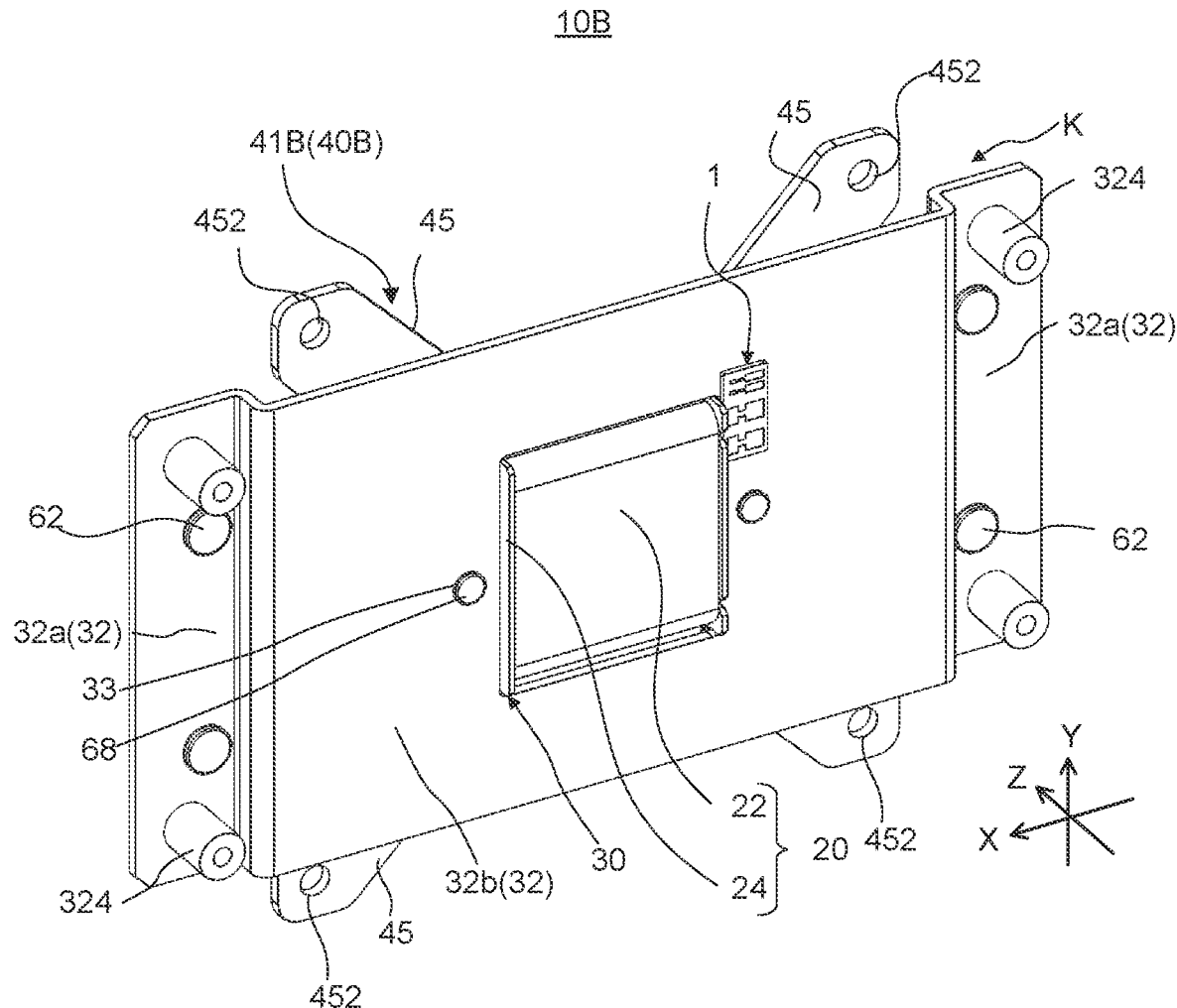
FIG. 27 is a rear perspective view of the same vibration actuator.
Figure 28:
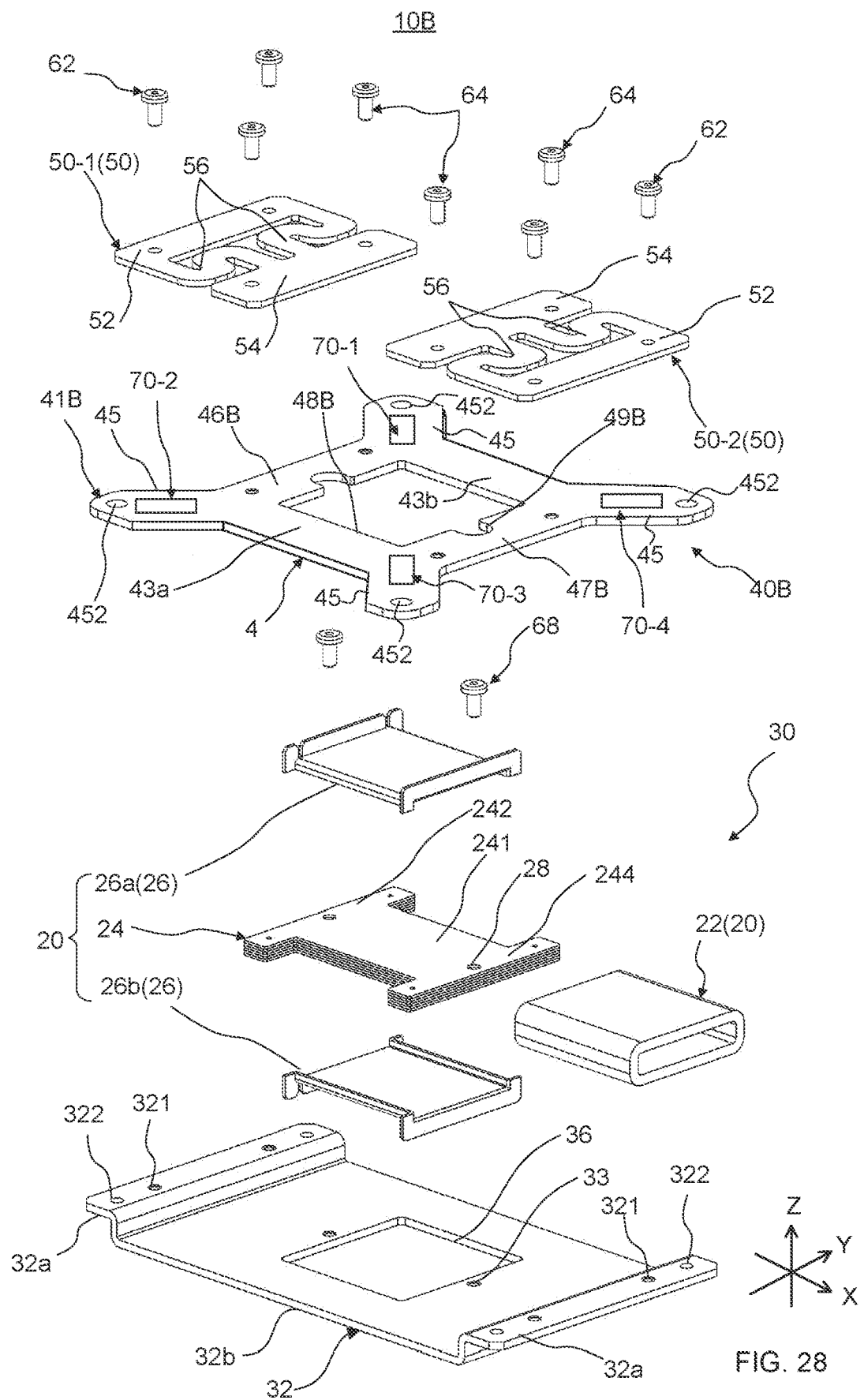
FIG. 28 is an exploded perspective view of the same vibration actuator.

FIG. 26 is a front perspective view of vibration actuator 10B according to Embodiment 3 of the present invention, FIG. 27 is a rear perspective view of vibration actuator 10B, and FIG. 28 is an exploded perspective view of vibration actuator 10B.

In vibration actuator 10B of Embodiment 3, the function of load detection module K in vibration actuator 10 is provided in movable part 40 of actuator main body A which is an electromagnetic actuator.

Compared to actuator main body A, vibration actuator 10B differs only in the configuration of yoke 41B with the detection portion of movable part 40B. Therefore, hereinafter, only a configuration of vibration actuator 10B different from that of actuator main body A will be described, and the same components as those of actuator main body A will be denoted by the same reference numerals and the same names, and description thereof will be omitted.

In the present embodiment, vibration actuator 10B is mounted on an electronic apparatus to be a vibration presenting apparatus together with control unit 1, and functions as a vibration generating source of touch panel 2 (see FIG. 1) which is an example of an operation device.

Similarly to vibration actuator 10 of Embodiment 1, vibration actuator 10B drives movable part 40B in one direction, and moves movable part 40B in the direction opposite to the one direction by the urging force of the members (plate-shaped elastic parts 50) for generating the urging force. Thus, vibration actuator 10B functions as an electromagnetic actuator to move movable part 40B in a linear reciprocating motion (vibration). Note that, vibration actuator 10B has the same magnetic circuit as that of actuator main body A of Embodiment 1, and movable part 40 reciprocates by the driving principle based on the expressions (1) and (2) as in actuator main body A.

Vibration actuator 10B includes fixing part 30 having base part 32 and core assembly 20 formed by winding coil 22 around core 24; movable part 40B having yoke 41B with the detection portion for a magnetic material; and plate-shaped elastic parts 50 (50-1, 50-2). Plate-shaped elastic parts 50 (50-1, 50-2) elastically support movable part 40B to be movable in the vibration direction with respect to fixing part 30.

Vibration actuator 10B vibrates yoke 41B with the detection portion of movable part 40B by core assembly 20. Specifically, similarly to vibration actuator 10, movable part 40B is vibrated with the attraction force of energized coil 22 and excited core 24 by energized coil 22 as well as the urging force by plate-shaped elastic parts 50 (50-1, 50-2).

Vibration actuator 10B detects the displacement of touch panel 2 (see FIG. 1) subjected to the pressing operation as the strain of extension parts 45 which are integrated with the movable part 40B by strain detection sensors 70-1 to 70-4 as the strain detection units. Movable part 40B can be moved and vibrated in accordance with the detected strain, and the vibration, as an operation feeling, is fed back to the touch panel (similar to touch panel 2 of FIG. 1) to which movable part 40B is fixed.

Detailed description of plate-shaped elastic parts 50-1 and 50-2 and fixing part 30 will be omitted because they have the same configuration and function as those of actuator main body A of vibration actuator 10 in Embodiment 1. Further, since the joining positions or the like of plate-shaped elastic parts 50-1 and 50-2 with respect to movable part 40B are the same as those of actuator main body A of vibration actuator 10, the description thereof will be omitted.

Movable part 40B is disposed to oppose to core assembly 20 with gap provided therebetween in the direction orthogonal to the vibrating direction (Z direction). Movable part 40B is provided to be able to reciprocally vibrate in the vibrating direction with respect to core assembly 20 via plate-shaped elastic parts 50-1 and 50-2.

Movable part 40B includes yoke 41B with the detection portion, and includes movable-part side fixing parts 54 of plate-shaped elastic parts 50-1 and 50-2 fixed to yoke 41B with the detection portion.

Similarly to movable part 40 of vibration actuator 10, movable part 40B is disposed in a state (standard normal position) being hanged while being spaced substantially in parallel and to be movable in the approaching/leaving directions (Z directions) with respect to bottom surface part 32b via plate-shaped elastic parts 50 (50-1, 50-2).

Yoke 41B with the detection portion has the same function as yoke 41 in Embodiment 1, and functions as a magnetic path of the magnetic flux generated when coil 22 is energized. Yoke 41B with the detection portion is a rectangular frame-like plate shape body made of a magnetic material such as electromagnetic stainless steel, a sintered material, an MIM (metal injection mold) material, a laminated steel sheet, an electrogalvanized steel sheet (SECC), or the like. In the present embodiment, yoke 41B with the detection portion is formed by processing an SECC sheet.

Yoke 41B with the detection portion is hanged to oppose to core assembly 20 with gap provided therebetween in the vibrating direction (Z direction) by plate-shaped elastic parts 50 (50-1, 50-2) respectively fixed to attracted surface parts 46 and 47 spaced from each other in the X direction.

Yoke 41B with the detection portion includes yoke main body 4 joined to plate-shaped elastic parts 50 (50-1, 50-2); extension parts 45 extending from yoke main body 4 and being fixed to an operation device (see touch panel 2 shown in FIG. 1) at attaching holes 452 on the tip side thereof; and strain detection sensors 70.

Yoke main body 4 includes attracted surface parts 46B and 47B oppositely disposed to magnetic pole parts 242 and 244; and frame forming parts 43a, 43b installed across in an orthogonal direction to attracted surface parts 46B, 47B between both end parts of attracted surface parts 46B, 47B. Yoke main body 4 is formed in a rectangular frame shape body having opening part 48B in the center thereof, by attracted surface parts 46B, 47B and frame forming parts 43a, 43b.

Opening part 48B opposes to coil 22. In the present embodiment, opening part 48B is located right above coil 22, and the opening shape of opening part 48B is a shape to which coil 22 part of core assembly 20 can be inserted when yoke 41B with the detection portion moves to bottom surface part 32b side.

Since yoke main body 4 has opening part 48B, the thickness of vibration actuator 10, and hence entire vibration actuator 10, can be decreased as compared to a case having no opening part 48B.

Further, core assembly 20 is located within opening part 48B, so that yoke 41B is not disposed in the vicinity of coil 22. Therefore, it is possible to suppress deterioration in the conversion efficiency due to the magnetic flux leakage leaked from coil 22, so that high output can be achieved.

Attracted surface parts 46B and 47B have the same functions as attracted surface parts 46 and 47 of vibration actuator 10. Attracted surface parts 46B and 47B are attracted to magnetic pole parts 242 and 244 magnetized in core assembly 20, and plate-shaped elastic parts 50 (50-1, 50-2) are fixed thereto. Since plate-shaped elastic parts 50 (50-1, 50-2) are fixed to attracted surface parts 46B, 47B of yoke main body 4, attracted surface parts 46B, 47B, that is, yoke main body 4 itself functions as a movable-part side fixing part (support-part side fixing part).

Movable-part side fixing parts 54 of plate-shaped elastic parts 50-1 and 50-2 are fixed by being laminated, respectively, on attracted surface parts 46B and 47B. Attracted surface parts 46B and 47B are provided with cutouts 49B escaping from the heads of screws 68 of core assembly 20 when yoke main body 4 is moved to bottom surface part 32b side.

Thereby, even when movable part 40B moves to bottom surface part 32b side and attracted surface parts 46B, 47B approach magnetic pole parts 242, 244, attracted surface parts 46B, 47B are not to be in contact with screws 68 that fix magnetic pole parts 242, 244 to bottom surface part 32b, so that movable area of yoke 41B with the detection portion in the Z direction can be secured for that.

Note that, also in Embodiment 3, the thickness of yoke 41B is the same as that of plate-shaped elastic parts 50, the cross sectional area of the magnetic material portion opposing to magnetic pole parts 242, 244 are double. Thereby, compared to a case where the plate spring is nonmagnetic, it is possible to ease the degradation of properties due to magnetic saturation in magnetic circuits and to improve the output, by expanding the magnetic circuit.

In movable part 40B, extension parts 45 connect fixing portions to the plate-shaped elastic parts 50 (50-1, 50-2) and fixing portions to the operation device (in the present embodiment, attaching holes 452), and are provided integrally with both.

Extension parts 45 are formed of a metallic plate integrated with yoke main body 4, and are formed so as to be positioned on the same plane as attracted surface parts 46B, 47B of yoke main body 4. In the present embodiment, attaching holes 452 on the tip sides of extension parts 45 and the mounting positions of movable-part side fixing parts 54 of plate-shaped elastic parts 50 (50-1, 50-2) in attracted surface parts 46B, 47B are provided at the same height position. In the present embodiment, extension parts 45 are provided so as to extend in the radial direction from the corner portions of yoke main body 4 with the center of yoke main body 4 (the center extending in the vibration direction (Z direction)) as the center.

Extension parts 45 are portions to be strain bodies of strain detection sensors 70.

When vibration is given in accordance with the pressing amount at the time of the pressing operation on the touch panel, extension parts 45 are distorted in accordance with the actual operation on the touch panel.

In a front view of movable part 40B, attaching holes 452 are positioned at or near part which is the outside around core assembly 20 and on a diagonal line.

Attaching holes 452 are fixed to touch panel 2 (vibration presenting unit, see FIG. 1). In the present embodiment, attaching holes 452 are provided at 4 positions surrounding yoke main body 4 of movable part 40B at four corners, and are respectively fixed to the vibration presenting unit.

By joining attaching holes 452 to touch panel 2, the center of movable part 40B is preferably disposed so as to be positioned on the same line as the center of the operation surface of touch panel 2. Thus, extension parts 45 can receive the displacement of touch panel 2.

Strain detection sensors 70 (70-1 to 70-4) are provided on extension parts 45. That is, strain detection sensors 70 (70-1 to 70-4) are disposed between attracted surface parts 46B and 47B each having the movable-part side fixing part and attaching holes 452 as the presenting-unit side fixing part.

Strain detection sensors 70 (70-1 to 70-4) are mounted on extension parts 45 functioning as the strain bodies, and detect strain of extension parts 45 when movable part 40B is pushed into bottom surface part 32b side. Note that, the detected strain is output to control unit 1 as in Embodiment 1, and vibration actuator 10B vibrates in accordance with the strain. Further, the connection of strain detection sensors 70 (70-1 to 70-4) are preferably the same as that of Embodiment 1.

According to vibration actuator 10B of Embodiment 3, the same effects as the Effects 1, 3 and 4 in vibration actuator 10 can be obtained. Further, in the present embodiment, similarly to position detection unit 2b of touch panel 2 of vibration presenting apparatus 200, touch panel 2 may include a position detection unit that detects the position of the finger (pressing object) of the operator pressing screen 2a of touch panel 2 in a non-contact manner. Thus, it is possible to obtain the same effect as Effect 5 of Embodiment 1.

Further, according to each of the embodiments, it is possible to reduce the cost without using a magnet or the like, and it is possible to express vibration of various touch operation feelings while reducing the cost of the entire apparatus.

Note that, although it is preferable that a plurality of plate-shaped elastic parts 50 is fixed at symmetrical positions with respect to the center of movable part 40, 40B, as described above, one plate-shaped elastic part 50 may support movable part 40 so as to be able to vibrate with respect to fixing part 30. Plate-shaped elastic part 50 may include at least two or more arm portions connecting movable part 40 and fixing part 30 and having meander-shaped elastic arm part 56. Plate-shaped elastic part 50 may be made of a magnetic material. In this case, movable-part side fixing parts 54 of plate-shaped elastic part 50 are disposed in the winding axis direction of coil 22 or in a direction orthogonal to the winding axis direction with respect to both end portions of core 24, and constitute a magnetic path together with core 24 when coil 22 is energized.

Further, in the configuration of each of vibration actuator 10, 10A and 10B, rivets may be used instead of the screws 62, 64, 68 and 69 as the fastening members used for fixing base part 32 and 32B to plate-shaped elastic part 50, and, fixing plate-shaped elastic part 50 to movable part 40 and 40B. Rivets consist of a head and a body without a screw part, and are inserted into holes of a members, and members are joined together by plastically deforming by caulking the opposite end of the rivets. The caulking may be performed using, for example, a press machine, a dedicated tool, or the like.

Based on strain data obtained by strain detection sensors 70, it may be possible to perform correction of the period of the input pulse due to individual differences among the components in vibration actuators 10, 10A, and 10B.

In the present embodiment, although the driving direction of vibration actuators 10 and 10A driven and controlled by control unit 1 is the Z direction, the present invention is not limited thereto. It is possible to obtain the effects such as the above-described efficient driving and strengthening of the vibration even in the direction parallel to the touch surface of the operator, specifically, X-direction or Y direction.

Further, by driving movable part 40 and 40B in one direction and then moving movable part 40 in the direction opposite to the one direction by the urging force of the members (plate-shaped elastic parts 50) for generating the urging force, vibration actuators 10, 10A, and 10B of each embodiment are electromagnetic actuators that linearly reciprocate (vibrate) movable parts 40 and 40B, but are not limited to this configuration. The vibration actuator may have any configuration as long as it has a configuration in which the movable part is supported by the plate-shaped elastic part such as a plate-like spring with respect to the fixing part in a freely vibrating manner and the movable part is attached to the touch panel or the like which is the vibration presenting (vibration feedback) target.

The arrangement positions of strain detection sensors 70-1 to 70-4 in vibration actuators 10A and 10B of Embodiments 2 and 3 are also provided in the same arrangement as strain detection sensors 70-1 to 70-4 of vibration actuator 10. That is, it is preferable that strain detection sensors 70-1 to 70-4 in vibration actuators 10A and 10B are provided at least three or more positions so as to radially surround the center of the operation surface (screen 2a) of touch panel 2 to be the vibration presenting unit at equal intervals. Thus, vibration actuator 10 can receive the displacement of touch panel 2 to be pressed by the surface and accurately detect the displacement. In vibration actuators 10A and 10B, similarly to vibration actuator 10, strain detection sensors 70-1 to 70-4 are positioned at four corner portions surrounding the center of the pressing operation region of touch panel 2 in a frame shape, and the same operation and effect as those of vibration actuator 10 are obtained.

As described above, embodiments of the present invention have been described. Note that the above description is illustrative of a preferred embodiment of the present invention, and the scope of the present invention is not limited thereto. That is, the configuration of the device and the shape of each part are only examples, and it is obvious that various modifications and additions to these examples are possible within the scope of the present invention.

INDUSTRIAL APPLICABILITY

The vibration actuator according to the present invention has an effect capable of giving vibrations in accordance with various touch feelings and being easily assembled. For example, in automotive products and industrial equipment, it is useful for operation devices in which operations are input by touching a finger or the like to an image on a screen, such as a touch display device equipped with a touch panel device that can feed back a sense of operation similar to the sense of operation when touching various images such as a mechanical switch displayed on the image.

REFERENCE SIGNS LIST

1 control unit
2 touch panel (vibration presenting unit)
2a screen (operation surface)
2b position detection unit
4 yoke main body
7 strain detector
9, 9A strain generating member
10, 10A, 10B vibration actuator
12 switching element
14 signal generating unit
20 core assembly
20a, 20b counter surface
22 coil
24 core
26 bobbins
26a, 26b split body
28, 321, 322 fixing hole
30, 30A fixing part
32, 32A, 32B base part
32a, 32Aa attaching part
32b, 32Ab bottom surface part
33 fastening hole
36, 36A opening part
37 movement regulated part
40, 40B movable part
41 yoke
41B yoke with detector
42 surface-part fixing hole
43a, 43b frame forming part
44 surface-part fixing part
44a fixing surface
45 extension part (strain body)
46, 46B, 47, 47B attracted surface part (support-part side fixing part)
48, 48B opening part
49, 49B cutout
50, 50-1, 50-2 plate-shaped elastic part (elastic support part)
52 fixing-part side fixing part
54 movable-part side fixing part 56 meander-shaped elastic arm part
62, 64, 68, 69 screw
70 strain detection sensor (strain detection unit)
72 FPC
92 movable-part side fixing part (support-part side fixing part)
94 presenting-unit side fixing part
95a body frame part
95b connecting-arm part
95c rib
96 movement regulating part
200, 200A vibration presenting apparatus
241 core main body
242, 244 magnetic pole part
400 stopper
452 attaching hole (presenting-unit side fixing part)

What is claimed is:

1. A vibration actuator that gives vibration to a vibration presenting unit that presents vibration depending on a pressing operation, the vibration actuator comprising:
   a fixing part;
   a movable part; and
   an elastic support part that movably supports the movable part with respect to the fixing part;
   wherein the movable part includes a plate spring member extending in a longitudinal direction of the movable part, the plate spring member being provided with a support-part side fixing part and a presenting-unit side fixing part which are separated from each other in the longitudinal direction, the support-part side fixing part being fixed to the elastic support part and the presenting-unit side fixing part being fixed to the vibration presenting unit,
   a portion between the support-part side fixing part and the presenting-unit side fixing part in the plate spring member is a strain body that is strained in accordance with the pressing operation on the vibration presenting unit and a strain detection unit configured to detect strain of the strain body are provided, and
   the movable part is configured to vibrate by electromagnetic driving in accordance with the strain of the strain body.

2. The vibration actuator according to claim 1,
   wherein the strain detection unit and the plate spring member including the strain body are configured separately from the movable part.

3. The vibration actuator according to claim 1,
   wherein the vibration presenting unit has an operation surface to be pressed, and
   the movable part vibrates in a direction perpendicular to the operation surface.

4. The vibration actuator according to claim 1,
   wherein the movable part is provided with a plurality of the plate spring members, and
   the plurality of the plate spring members is integrally formed.

5. The vibration actuator according to claim 1,
   wherein a plurality of the strain detection units is provided.

6. The vibration actuator according to claim 5,
   wherein the plurality of strain detection units are strain detection sensors of a full-bridge connection, and are connected in parallel to each other.

7. The vibration actuator according to claim 1, further comprising:
   a movement regulating part that regulates movement of the support-part side fixing part with respect to the vibration presenting unit.

8. A vibration presenting apparatus, comprising:
   a touch panel as the vibration presenting unit; and
   a vibration actuator according to claim 1, that gives vibration to the touch panel.

9. The vibration presenting apparatus according to claim 8,
   wherein the touch panel includes a position detection unit that detects a position of a pressing object by detecting a capacitance between the position detection unit and the pressing object that presses the touch panel, and
   the movable part gives vibration to the touch panel based on the position of the pressing object and the strain of the strain body.

10. The vibration actuator according to claim 1,
    wherein the movable part includes a body part having a flat shape and an arm part, as the plate spring member, configured to respectively extend from four corners of the body part.

11. The vibration actuator according to claim 4,
    wherein a single flexible printed circuit board, that mounts a plurality of the strain detection units disposed on each position of the plurality of the strain bodies, is provided on the integrated plate spring member.

* * * * *